(12) United States Patent
Knibbeler et al.

(10) Patent No.: US 11,928,803 B2
(45) Date of Patent: Mar. 12, 2024

(54) APPARATUS AND METHOD FOR DYNAMIC RANGE TRANSFORMING OF IMAGES

(71) Applicant: KONINKLIJKE PHILIPS N.V., Eindhoven (NL)

(72) Inventors: Charles Leonardus Cornelius Maria Knibbeler, Eindhoven (NL); Renatus Josephus Van Der Vleuten, Veldhoven (NL); Wiebe De Haan, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 530 days.

(21) Appl. No.: 16/251,627

(22) Filed: Jan. 18, 2019

(65) Prior Publication Data

US 2019/0156471 A1 May 23, 2019

Related U.S. Application Data

(63) Continuation of application No. 14/346,765, filed as application No. PCT/IB2012/054984 on Sep. 20, 2012.

(Continued)

(30) Foreign Application Priority Data

Sep. 27, 2011 (EP) .................................... 11182922
Mar. 21, 2012 (EP) .................................... 12160557

(51) Int. Cl.
*G06T 5/50* (2006.01)
*G06T 11/00* (2006.01)
(Continued)

(52) U.S. Cl.
CPC ................. *G06T 5/92* (2024.01); *G06T 5/50* (2013.01); *G06T 11/001* (2013.01);
(Continued)

(58) Field of Classification Search
None
See application file for complete search history.

(56) References Cited

U.S. PATENT DOCUMENTS 6,480,202 B1   11/2002  Deguchi et al.
7,400,363 B2    7/2008  Suga et al.
(Continued)

FOREIGN PATENT DOCUMENTS

EP   1489853 A2   12/2004
JP   0965160 A     3/1997
(Continued)

OTHER PUBLICATIONS

Zicong Mai, Hassan Mansour, Rafal Mantiuk, Panos Nasiopoulos, Rabab Ward, Wolfgang Heidrich, "Optimizing a Tone Curve for Backward-Compatible High Dynamic Range Image and Video Compression", Dec. 3, 2010, IEEE, IEEE Transactions on Image Processing, vol. 20, Issue 6, pp. 1558-1571.*

(Continued)

*Primary Examiner* — Robert Bader

(57) ABSTRACT

An image processing apparatus comprises a receiver (201) for receiving an image signal which comprises at least an encoded image and a target display reference. The target display reference is indicative of a dynamic range of a target display for which the encoded image is encoded. A dynamic range processor (203) generates an output image by applying a dynamic range transform to the encoded image in response to the target display reference. An output (205) then outputs an output image signal comprising the output image, e.g. to a suitable display. The dynamic range transform may furthermore be performed in response to a display dynamic range indication received from a display. The invention may be used to generate an improved High (Continued)

Dynamic Range (HDR) image from e.g. a Low Dynamic Range (LDR) image, or vice versa.

35 Claims, 23 Drawing Sheets

Related U.S. Application Data

(60) Provisional application No. 61/588,731, filed on Jan. 20, 2012.

(51) Int. Cl.

| | |
|---|---|
| *G09G 3/20* | (2006.01) |
| *G09G 5/00* | (2006.01) |
| *G09G 5/10* | (2006.01) |
| *G11B 20/10* | (2006.01) |
| *G11B 27/10* | (2006.01) |
| *G11B 27/32* | (2006.01) |
| *H04N 7/00* | (2011.01) |
| *H04N 9/68* | (2023.01) |

(52) U.S. Cl.
CPC ........... *G09G 3/2003* (2013.01); *G09G 5/006* (2013.01); *G09G 5/10* (2013.01); *G11B 20/10* (2013.01); *G11B 27/105* (2013.01); *G11B 27/329* (2013.01); *H04N 7/00* (2013.01); *H04N 9/68* (2013.01); *G06T 2207/20208* (2013.01); *G09G 2320/0271* (2013.01); *G09G 2320/0606* (2013.01); *G09G 2320/0613* (2013.01); *G09G 2320/066* (2013.01); *G09G 2340/06* (2013.01); *G09G 2360/144* (2013.01); *G09G 2370/047* (2013.01)

(56) References Cited

U.S. PATENT DOCUMENTS

| | | | |
|---|---|---|---|
| 7,542,056 B2 | 6/2009 | Oh | |
| 7,683,857 B2 | 3/2010 | Yoshida | |
| 8,310,562 B2 | 11/2012 | Kurane | |
| 8,369,639 B2 | 2/2013 | Yokose et al. | |
| 8,483,479 B2 | 7/2013 | Kunkel et al. | |
| 9,412,156 B2 | 8/2016 | Ward et al. | |
| 10,097,822 B2 | 10/2018 | Newton et al. | |
| 2004/0061709 A1 | 4/2004 | Oh | |
| 2007/0201560 A1 | 8/2007 | Segall et al. | |
| 2007/0268242 A1 | 11/2007 | Baba et al. | |
| 2008/0055228 A1 | 3/2008 | Glen | |
| 2009/0027558 A1 | 1/2009 | Mantiuk | |
| 2009/0034868 A1 | 2/2009 | Rempel | |
| 2010/0118008 A1 | 5/2010 | Matsuoka | |
| 2010/0172411 A1 | 7/2010 | Efremov | |
| 2010/0303439 A1 | 12/2010 | Doser | |
| 2010/0321396 A1 | 12/2010 | Xu | |
| 2011/0154426 A1 | 6/2011 | Doser et al. | |
| 2011/0194618 A1 | 8/2011 | Gish | |
| 2011/0242142 A1 | 10/2011 | Hussain et al. | |
| 2012/0019722 A1 | 1/2012 | Kwisthout et al. | |
| 2012/0038782 A1 | 2/2012 | Messmer et al. | |
| 2013/0038790 A1 | 2/2013 | Seetzen et al. | |
| 2013/0120656 A1 | 5/2013 | Wilson | |
| 2013/0148029 A1 | 6/2013 | Gish | |
| 2014/0341272 A1* | 11/2014 | Miller | H04N 5/202 375/240.02 |

FOREIGN PATENT DOCUMENTS

| | | |
|---|---|---|
| JP | 2002149149 A | 5/2002 |
| JP | 2005006038 A | 1/2005 |
| WO | 2005104035 A1 | 11/2005 |
| WO | 2009015483 A1 | 2/2009 |
| WO | 2009135358 A1 | 11/2009 |
| WO | 2010100609 A1 | 9/2010 |
| WO | 20100128962 A1 | 11/2010 |
| WO | 20100132237 A1 | 11/2010 |
| WO | 2011107905 A1 | 9/2011 |

OTHER PUBLICATIONS

Jane Hunter, Liz Armstrong, "A comparison of schemas for video metadata representation", May 17, 1999, Elsevier, Computer Networks, vol. 31, Issues 11-16, pp. 1431-1451.*

Wikipedia, "Enumerated type", retrieved from "https://en.wikipedia.org/wiki/Enumerated_type" on Dec. 31, 2020.*

* cited by examiner

APPARATUS AND METHOD FOR DYNAMIC RANGE TRANSFORMING OF IMAGES

CROSS-REFERENCE TO PRIOR APPLICATIONS

This application is a continuation of U.S. Ser. No. 14/346,765, filed on Mar. 24, 2014, which is the U.S. National Phase application under 35 U.S.C. § 371 of International Application No. PCT/IB2012/054984, filed on Sep. 20, 2012, which claims the benefit of U.S. Provisional Application No. 61/588,731, filed on Jan. 20, 2012, European Patent Application No. 12160557.0, filed on Mar. 21, 2012 and European Patent Application No. 11182922.2, filed on Sep. 27, 2011. These applications are hereby incorporated by reference herein.

FIELD OF THE INVENTION

The invention relates to dynamic range transforms for images, and in particular, but not exclusively to image processing to generate High Dynamic Range images from Low Dynamic Range images or to generate Low Dynamic Range images from High Dynamic Range images.

BACKGROUND OF THE INVENTION

Digital encoding of various source signals has become increasingly important over the last decades as digital signal representation and communication increasingly has replaced analogue representation and communication. Continuous research and development is ongoing in how to improve the quality that can be obtained from encoded images and video sequences while at the same time keeping the data rate to acceptable levels.

An important factor for perceived image quality is the dynamic range that can be reproduced when an image is displayed. Conventionally, the dynamic range of reproduced images has tended to be substantially reduced in relation to normal vision. Indeed, luminance levels encountered in the real world span a dynamic range as large as 14 orders of magnitude, varying from a moonless night to staring directly into the sun. Instantaneous luminance dynamic range and the corresponding human visual system response can fall between 10.000:1 and 100.000:1 on sunny days or at night (bright reflections versus dark shadow regions). Traditionally, dynamic range of displays has been confined to about 2-3 orders of magnitude, and also sensors had a limited range, e.g. <10.000:1depending on noise acceptability. Consequently, it has traditionally been possible to store and transmit images in 8-bit gamma-encoded formats without introducing perceptually noticeable artifacts on traditional rendering devices. However, in an effort to record more precise and livelier imagery, novel High Dynamic Range (HDR) image sensors that are capable of recording dynamic ranges of more than 6 orders of magnitude have been developed. Moreover, most special effects, computer graphics enhancement and other post-production work are already routinely conducted at higher bit depths and with higher dynamic ranges.

Furthermore, the contrast and peak luminance of state-of-the-art display systems continues to increase. Recently, new prototype displays have been presented with a peak luminance as high as 3000 $Cd/m^2$ and contrast ratios of 5-6 orders of magnitude (display native, the viewing environment will also affect the finally rendered contrast ratio, which may for daytime television viewing even drop below 50:1). It is expected that future displays will be able to provide even higher dynamic ranges and specifically higher peak luminances and contrast ratios. When traditionally encoded 8-bit signals are displayed on such displays, annoying quantization and clipping artifacts may appear. Moreover, traditional video formats offer insufficient headroom and accuracy to convey the rich information contained in new HDR imagery.

As a result, there is a growing need for new approaches that allow a consumer to fully benefit from the capabilities of state-of-the-art (and future) sensors and display systems. Preferably, representations of such additional information are backwards-compatible such that legacy equipment can still receive ordinary video streams, while new HDR-enabled devices can take full advantage of the additional information conveyed by the new format. Thus, it is desirable that encoded video data not only represents HDR images but also allows encoding of the corresponding traditional Low Dynamic Range (LDR) images that can be displayed on conventional equipment.

In order to successfully introduce HDR systems and to fully exploit the promise of HDR, it is important that the approach taken provides both backwards compatibility and allows optimization or at least adaptation to HDR displays. However, this inherently involves a conflict between optimization for HDR and optimization for traditional LDR.

For example, typically image content, such as video clips, will be processed in the studio (color grading & tone mapping) for optimal appearance on a specific display. Traditionally, such optimization has been performed for LDR displays. For example, during production for a standard LDR display, color grading experts will balance many picture quality aspects to create the desired 'look' for the storyline. This may involve balancing regional and local contrasts, sometimes even deliberately clipping pixels. For example, on a display with relatively low peak brightness, explosions or bright highlights are often severely clipped to convey an impression of high brightness to the viewer (the same thing happens for dark shadow details on displays with poor black levels). This operation will typically be performed assuming a nominal LDR display and traditionally displays have deviated relatively little from such nominal LDR displays as indeed virtually all consumer displays are LDR displays.

However, if the movie was adapted for an HDR target display, the outcome would be very different. Indeed, the color experts would perform an optimization that would result in a very different code mapping. For example, not only can highlights and shadow details be better preserved on HDR displays but these may also be optimized to have different distribution over mid-grey tones. Thus, an optimal HDR image is not achieved by a simple scaling of an LDR image by a value corresponding to the difference in the white point luminances (the maximum achievable brightness).

Ideally, separate color gradings and tone mappings would be performed for each possible dynamic range of a display. For example, one video sequence would be for a maximum white point luminance of 500 $Cd/m^2$, one for 1000 $Cd/m^2$, one for 1500 $Cd/m^2$ etc. up to the maximum possible brightness. A given display could then simply select the video sequence corresponding to its brightness. However, such an approach is impractical as it requires a large number of video sequences to be generated thereby increasing the resource required to generate these different video sequences. Furthermore, the storage and distribution capacity required would increase substantially. Also, the approach would limit the possible maximum display brightness level to discrete levels thereby providing suboptimal performance for displays with maximum display brightness levels in between the levels for which video sequences are being provided. Furthermore, such an approach will not allow future displays developed with higher maximum brightness levels than for the highest brightness level video sequence to be exploited.

Accordingly, it is expected that only a limited number of video sequences will be created at the content provision side, and it is expected that automatic dynamic range conversions will be applied at later points in the distribution chain to such video sequences in order to generate a video sequence suitable for the specific display on which the video sequence is rendered. However, in such approaches the resulting image quality is highly dependent on the automatic dynamic range conversion.

Hence, an improved approach for supporting different dynamic ranges for images, and preferably for supporting different dynamic range images, would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an image processing apparatus comprising: a receiver for receiving an image signal, the image signal comprising at least a first encoded image and a first target display reference, the first target display reference being indicative of a dynamic range of a first target display for which the first encoded image is encoded; a dynamic range processor arranged to generate an output image by applying a dynamic range transform to the first encoded image in response to the first target display reference; and an output for outputting an output image signal comprising the output image.

The invention may allow a system to support different dynamic range images and/or displays. In particular, the approach may allow improved dynamic range transforms that can adapt to the specific characteristics of the rendering of the image. In many scenarios an improved dynamic range transform from LDR to HDR images or from HDR to LDR can be achieved.

In some embodiments, the dynamic range transform increases a dynamic range of the output video signal relative to the first encoded image. In some embodiments, the dynamic range transform decreases a dynamic range of the output video signal relative to the first encoded image.

A dynamic range corresponds to a rendering luminance range, i.e. to a range from a minimum light output to a maximum light output for the rendered image. Thus, a dynamic range is not merely a ratio between a maximum value and a minimum value, or a quantization measure (such as a number of bits), but corresponds to an actual luminance range for a rendering of an image. Thus, a dynamic range may be a range of luminance values, e.g. measured in candela per square meter ($cd/m^2$) which is also referred to as nits. A dynamic range is thus the luminance range from the light output (brightness) corresponding to the lowest luminance value (often assumed to be absolute black i.e. no light output) to the light output (brightness) corresponding to the highest luminance value. The dynamic range may specifically be characterized by the highest light output value, also referred to as the white point, white point luminance, white luminance or maximum luminance. For LDR images and LDR displays, the white point is typically 500 nits or less.

The output image signal may specifically be fed to a display having a specific dynamic range, and thus the dynamic range transform may convert the encoded image from a dynamic range indicated by the target display reference to a dynamic range of the display on which the image is rendered.

The image may be an image of a moving image sequence, such as e.g. a frame or image of a video sequence. As another example, the image may be a permanent background or e.g. an overlay image such as graphics etc.

The first encoded image may specifically be an LDR image and the output image may be an HDR image. The first encoded image may specifically be an HDR image and the output image may be an LDR image.

In accordance with an optional feature of the invention, the first target display reference comprises a white point luminance of the first target display.

This may provide advantageous operation in a many embodiments. In particular, it may allow low complexity and/or low overhead while providing sufficient information to allow an improved dynamic range transform to be performed.

In accordance with an optional feature of the invention, the first target display reference comprises an Electro Optical Transfer Function indication for the first target display.

This may provide advantageous operation in a many embodiments. In particular, it may allow low complexity and/or low overhead while providing sufficient information to allow an improved dynamic range transform to be performed. The approach may in particular allow the dynamic range transform to also adapt to specific characteristics for e.g. midrange luminances. For example, it may allow the dynamic range transform to take into account differences in the gamma of the target display and the end-user display.

In accordance with an optional feature of the invention, the first target display reference comprises a tone mapping indication representing a tone mapping used to generate the first encoded image for the first target display.

This may allow an improved dynamic range transform to be performed in many scenarios, and may specifically allow the dynamic range transform to compensate for specific characteristics of the tone mapping performed at the content creation side.

In some scenarios, the image processing device may thus take into account both characteristics of the display for which the encoded image has been optimized and characteristics of the specific tone mapping. This may e.g. allow subjective and e.g. artistic tone mapping decisions to be taken into account when transforming an image from one dynamic range to another.

In accordance with an optional feature of the invention, the image signal further comprises a data field comprising dynamic range transform control data; and the dynamic range processor is further arranged to perform the dynamic range transform in response to the dynamic range transform control data.

This may provide improved performance and/or functionality in many systems. In particular, it may allow localized and targeted adaptation to specific dynamic range displays while still allowing the content provider side to retain some control over the resulting images.

The dynamic range transform control data may include data specifying characteristics of the dynamic range transform which must and/or may be applied and/or it may specify recommended characteristics of the dynamic range transform.

In accordance with an optional feature of the invention, the dynamic range transform control data comprises different dynamic range transform parameters for different display maximum luminance levels.

This may provide improved control and/or adaptation in many embodiments. In particular, it may allow the image processing device 103 to select and apply appropriate control data for the specific dynamic range the output image is generated for.

In accordance with an optional feature of the invention, the dynamic range transform control data comprises different tone mapping parameters for different display maximum luminance levels, and the dynamic range processor is arranged to determine tone mapping parameters for the dynamic range transform in response to the different tone mapping parameters and a maximum luminance for the output image signal.

This may provide improved control and/or adaptation in many embodiments. In particular, it may allow the image processing device 103 to select and apply appropriate control data for the specific dynamic range the output image is generated for. The tone mapping parameters may specifically provide parameters that must, may or are recommended for the dynamic range transform.

In accordance with an optional feature of the invention, the dynamic range transform control data comprises data defining a set of transform parameters that must be applied by the dynamic range transform.

This may allow a content provider side to retain control over images rendered on displays supported by the image processing device. This may ensure homogeneity between different rendering situations. The approach may for example allow a content provider to ensure that the artistic impression of the image will remain relatively unchanged when rendered on different displays.

In accordance with an optional feature of the invention, the dynamic range transform control data comprises data defining limits for transform parameters to be applied by the dynamic range transform.

This may provide improved operations and an improved user experience in many embodiments. In particular, it may in many scenarios allow an improved trade-off between the desire of a content provider to retain control over rendering of his/her content while allowing an end user to customize it to his/her preferences.

In accordance with an optional feature of the invention, the dynamic range transform control data comprises different transform control data for different image categories.

This may provide improved transformed images in many scenarios. In particular it may allow the dynamic range transform to be optimized for the individual characteristics of the different images. For example, different dynamic range transforms may be applied to images corresponding to the main image, images corresponding to graphics, images corresponding to a background etc.

In accordance with an optional feature of the invention, a maximum luminance of the dynamic range of the first target display is no less than 1000 nits.

The image to be transformed may be an HDR image. The dynamic range transform may transform such an HDR image to another HDR image (associated with a display having a dynamic range of no less than 1000 nits) having a different dynamic range. Thus, improved image quality may be achieved by converting one HDR image for one dynamic range to another HDR image for another dynamic range (which may have a higher or lower white point luminance).

In accordance with an optional feature of the invention, the image signal comprises a second encoded image and a second target display reference, the second target display reference being indicative of a dynamic range of a second target display for which the second encoded image is encoded, the dynamic range of the second target display being different than the dynamic range of the first target display; and the dynamic range processor is arranged to apply the dynamic range transform to the second encoded image in response to the second target display reference.

This may allow improved output quality in many scenarios. In particular, different transformations may be applied for the first encoded image and for the second encoded image dependent on the differences of the associated target displays (and typically dependent on how each of these relate to the desired dynamic range of the output image).

In accordance with an optional feature of the invention, the image dynamic range processor is arranged to generate the output image by combining the first encoded image and the second encoded image.

This may provide improved image quality in many embodiments and scenarios. In some scenarios, the combination may be a selection combination where the combination is performed simply by selecting one of the images.

In accordance with an optional feature of the invention, the image processing apparatus further comprises: a receiver for receiving a data signal from a display, the data signal comprising a data field which comprises a display dynamic range indication of the display, the display dynamic range indication comprising at least one luminance specification; and the dynamic range processor is arranged to apply the dynamic range transform to the first encoded image in response to the display dynamic range indication.

This may allow improved image rendering in many embodiments.

In accordance with an optional feature of the invention, the dynamic range processor is arranged to select between generating the output image as the first encoded image and generating the output image as a transformed image of the first encoded image in response to the first target display reference.

This may allow improved image rendering in many embodiments and/or may reduce the computational load. For example, if the end-user display has a dynamic range which is very close to that for which the encoded image has been generated, improved quality of the rendered image will typically be achieved if the received image is used directly. However, if the dynamic ranges are sufficiently different, improved quality is achieved by processing the image to adapt it to the different dynamic range. In some embodiments, the dynamic range transform may simply be adapted switch between a null operation (using the first encoded image directly) and applying a predetermined and fixed dynamic range transform if the target display reference is sufficiently different from the end user display.

In accordance with an optional feature of the invention, the dynamic range transform comprises a gamut transform.

This may allow an improved output image to be generated in many embodiments and scenarios. In particular, it may allow a perceived improved color rendering and may for example compensate for changes in color perception resulting from changes in the brightness of image areas. In some embodiments the dynamic range transform may consist in a gamut transform.

In accordance with an optional feature of the invention, the image processing apparatus further comprises a control data transmitter for transmitting dynamic range control data to a source of the image signal.

This may allow the source to adapt the image signal in response to the dynamic range control data. The dynamic range control data may specifically comprise an indication of a preferred dynamic range for the image, and/or an indication of a dynamic range (e.g. white point luminance and optionally EOTF or gamma function) for the end-user display.

According to an aspect of the invention there is provided an image signal source apparatus comprising: a receiver for receiving a encoded image; a generator for generating an image signal comprising the encoded image and a target display reference indicative of a dynamic range of a target display for which the encoded image is encoded; a transmitter for transmitting the image signal According to an aspect of the invention there is provided an image processing method comprising:

receiving an image signal, the image signal comprising at least a first encoded image and a first target display reference, the first target display reference being indicative of a dynamic range of a first target display for which the first encoded image is encoded;

generating an output image by applying a dynamic range transform to the first encoded image in response to the first target display reference; and outputting an output image signal comprising the output image.

According to an aspect of the invention there is provided a method of transmitting an image signal, the method comprising: receiving an encoded image; generating an image signal comprising the encoded image and a target display reference indicative of a dynamic range of a target display for which the encoded image is encoded; and transmitting the image signal According to an aspect of the invention there is provided an image signal comprising at least a first encoded image and a first target display reference, the first target display reference being indicative of a dynamic range of a first target display for which the first encoded image is encoded.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
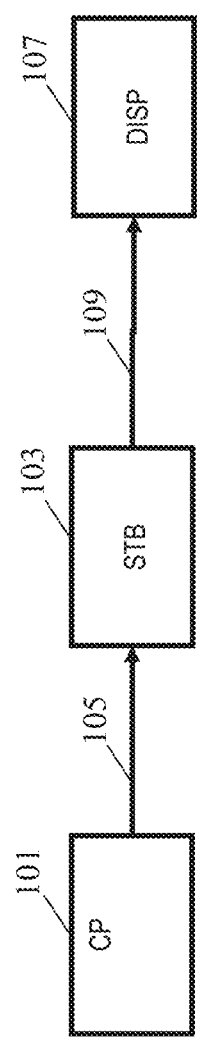
FIG. 1 is an illustration of examples of elements of an image rendering system in accordance with some embodiments of the invention.

FIG. 1 illustrates an example of an audio visual distribution path. In the example, a content provider apparatus 101 generates an audio visual content signal for an audiovisual content item, such as e.g. a film, a television program etc. The content provider apparatus 101 may specifically encode the audiovisual content in accordance with a suitable encoding format and color representation. In particular, the content provider apparatus 101 may encode the images of a video sequence of the audiovisual content item in accordance with a suitable representation such as e.g. YCrCb. The content provider apparatus 101 may be considered to represent a production and distribution house which creates and broadcasts the content.

The audio visual content signal is then distributed to an image processing device 103 via a distribution path 105. The image processing device 103 may for example be a set-top box residing with a specific consumer of the content item, such as e.g. a Personal Video Recorder, a Blu-ray™ player, a network (e.g. Internet) streaming device, a satellite or terrestrial television receiver, etc.

The audio-visual content is encoded and distributed from the content provider apparatus 101 through a medium, which may e.g. consist of packaged medium or a communication medium. It then reaches a source device in the form of the image processing device 103 which comprises functionality for decoding and playing back the content.

It will be appreciated that the distribution path 105 may be any distribution path and via any medium or using any suitable communication standard. Further, the distribution path need not be real time but may include permanent or temporary storage. For example, the distribution path may include the Internet, satellite, cable or terrestrial broadcasting, a mobile or fixed communication network etc., or storage on physically distributed media such as DVD or Blu-ray Disc™ or a memory card etc.

The image processing device 103 is coupled to a display 107 via a communication path 109. The image processing device 103 generates a display signal representing the audiovisual content item. Thus, the source device streams the decoded content to a sink device, which may be a TV or another device which converts the digital signals to a physical representation.

The image processing device 103 may perform e.g. image enhancement or signal processing algorithms on the data and may specifically decode and re-encode the (processed) audiovisual signal. The re-encoding may specifically be to a different encoding or representation format than for the received signal.

The system of FIG. 1 is in some embodiments arranged to provide High Dynamic Range (HDR) video information to the display 107 and in other embodiments or scenarios is arranged to provide a Low Dynamic Range (LDR) image to the display 107. Further, in order to provide e.g. improved backwards compatibility, it may in some scenarios be able to provide both an LDR and an HDR image depending on the display on which it is displayed. Specifically, the system is able to communicate/distribute image signals relating to both LDR and HDR images.

Conventional displays typically use an LDR representation. Typically such LDR representations are provided by a three component 8 bit representation related to specified primaries. For example, an RGB color representation may be provided by three 8 bit samples referenced to a Red, Green, and Blue primary respectfully. Another representation uses one luma component and two chroma components (such as YCrCb). These LDR representations correspond to a given brightness or luminance range.

HDR specifically allows for significantly brighter images (or image areas) to be presented appropriately on HDR displays. Indeed, an HDR image displayed on an HDR display may provide a substantially brighter white than can be provided by the corresponding LDR image presented on an LDR display. Indeed, an HDR display may allow typically at least a four times brighter white than an LDR display. The brightness may specifically be measured relative to the darkest black that can be represented or may be measured relative to a given grey or black level.

The LDR image may specifically correspond to specific display parameters, such as a fixed bit resolution related to a specific set of primaries and/or a specific white point. For example, 8-bits may be provided for a given set of RGB primaries and e.g. a white point of 500 Cd/m2. The HDR image is an image which includes data that should be rendered above these restrictions. In particular, a brightness may be more than four times brighter than the white point (e.g. 2000 Cd/m2) or more.

High dynamic range pixel values have a luminance contrast range (brightest luminance in the set of pixels divided by darkest luminance) which is (much) larger than a range that can be faithfully displayed on the displays standardized in the NTSC and MPEG-2 era (with its typical RGB primaries, and a D65 white with maximum driving level [255, 255, 255] a reference brightness of e.g. 500 nit or below). Typically for such a reference display 8 bits suffice to display all grey values between approximately 500 nit and approximately 0.5 nit (i.e. with contrast range 1000:1 or below) in visually small steps, whereas HDR images are encoded with a higher bit word, e.g. 10 bit (which is also captured by a camera with a larger well depth and DAC, e.g. 14 bit). In particular, HDR images typically contain many pixel values (of bright image objects) above a scene white. In particular, several pixels are brighter than two times a scene white. This scene white may typically be equated with the white of the NTSC/MPEG-2 reference display.

The number of bits used for the HDR images X may typically be larger than or equal to the number of bits Y used for LDR images (X may typically be e.g. 10 or 12, or 14 bit (per color channel if several of the channels are used), and Y may e.g. be 8, or 10 bits). A transformation/mapping may be required to fit pixels in a smaller range, e.g. a compressive scaling. Typically, a non-linear transformation may be involved, e.g. a logarithmic encoding may encode (as lumas) a far larger luminance range in an X-bit word than a linear encoding, be it that the luminance difference steps from one value to the next are then not equidistant, but nor are they required to be so for the human visual system.

It should be noted that the difference between LDR and HDR images is not merely that a larger number of bits are used for HDR images than for LDR images. Rather, HDR images cover a larger luminance range than LDR images and typically have a higher maximum luminance value, i.e. a higher white point. Indeed, whereas LDR images have a maximum luminance (white) point corresponding to no more than 500 nits, HDR images have a maximum luminance (white) point corresponding to more than 500 nits, and often no less than 1000 nits, 2000 nits or even 4000 nits or higher. Thus, an HDR image does not merely use more bits corresponding to a higher granularity or improved quantization but rather corresponds to a larger actual luminance range. Thus, the brightest possible pixel value generally corresponds to a luminance/light output which is higher for an HDR image than for an LDR image. Indeed, HDR and LDR images may use the same number of bits but with the HDR image values being referenced to a larger luminance dynamic range/brighter maximum luminance than the LDR image values (and thus with the HDR images being represented with a more coarse quantization on a luminance scale).

Ideally, the content provided by the content provider apparatus 101 will be captured and encoded with reference to a luminance range that matches the luminance range of the display 107. However, in practical systems the content may be rendered on many different displays with many different characteristics, and/or may be encoded according to standards that are based on luminance ranges which differ from the luminance range of the specific display 107. Furthermore, the content may not originally be captured by a capturing device or approach that exactly matches the luminance range of the display.

Accordingly, the support of HDR in a content system typically requires some transformation or conversion between different luminance ranges. For example, if an LDR image is received and should be presented on an HDR display, a conversion from LDR to HDR should be performed. If an HDR image is received and should be presented on an LDR display, a conversion from HDR to LDR should be performed. Such conversions are typically rather complex and do not merely equate to a simple scaling of the luminance ranges as such a scaling would result in an image which would be perceived as unnaturally looking. Rather complex transformations are typically used and these transformations are often referred to using the term tone mapping.

In principle, such luminance transformations could be performed at three different places in the content distribution system.

One option is to perform it at the content provider apparatus 101. Typically, this may allow the same luminance transformation operation to be distributed to multiple displays thereby allowing a single transformation to be used for many users. This may allow and justify complex, manual and resource demanding tone mapping to be performed, e.g. by skilled tone mapping experts. Indeed, this may provide a subjectively optimized image for a given luminance range, often referred to as an artistic tone mapping. However, such an approach is very resource demanding and is not feasible for application to many displays. Furthermore, a separate image stream is required for each supported luminance range resulting in a very high communication resource being needed which is impractical for many systems.

Another option is to perform the luminance transform in the image processing device 103. However, as the general user is not skilled in luminance transforms and since the required effort renders it impractical to perform manual adaptation (especially for moving images, such as video clips, films etc), the transformation should preferably be automatic. However, such transforms are conventionally not able to provide optimum images. In particular, the optimum transform may depend on the specific type of content, the intended characteristics of the image (e.g. different transforms may be appropriate for a scene intended to be dark and menacing and a scene which is just intended to be dark to indicate a night time scene). Furthermore, the content originator may be concerned about the potential impact of such automatic transforms and may be reluctant to lose the control over how the content may be presented in different scenarios. Also, the optimum transformation will typically depend on the exact characteristics of the display 107 and a transformation based on an assumed, nominal or standard display will typically result in suboptimal transforms.

The transform may possibly also be performed in the display 107.

In the system of FIG. 1 the image processing device 103 comprises functionality for performing a luminance dynamic range transform on an image (or set of images, such as e.g. a video sequence) received from the content processing device 103 in order to increase the dynamic range thereof. In particular, the image processing device 103 receives an image from the content provider apparatus 101 then processes the image to generate a higher dynamic range image. Specifically, the received image may be an LDR image which is converted into an HDR image by applying the luminance dynamic range transform to increase the dynamic range. The transformed image can then be output to the display 107 being an HDR display thereby resulting in the originally received LDR image being converted into a rendered HDR image. A dynamic range transform may map luminance values of (at least part) of an input image associated with one dynamic range to luminance values for (at least part) of an output image associated with a different dynamic range.

In another scenario, the image processing device 103 may receive an image from the content provider apparatus 101 and then process the image to generate a lower dynamic range image. Specifically, the received image may be an HDR image which is converted into an LDR image by applying the luminance dynamic range transform to decrease the dynamic range. The transformed image can then be output to the display 107 being an LDR display thereby resulting in the originally received HDR image being converted into a rendered LDR image.

In the system of FIG. 1, the dynamic range transform is adapted in dependence on information received from the content provider apparatus 101 and/or the display 107. Thus, in the system, the dynamic range transform is not merely a locally performed operation in the image processing device 103 but may also be dependent on characteristics, properties or information from the content provider apparatus 101 and/or the display 107.

First the system of FIG. 1 will be described with reference to a situation where the dynamic range transform is based on information provided to the image processing device 103 from the content provider apparatus 101.

Figure 2:
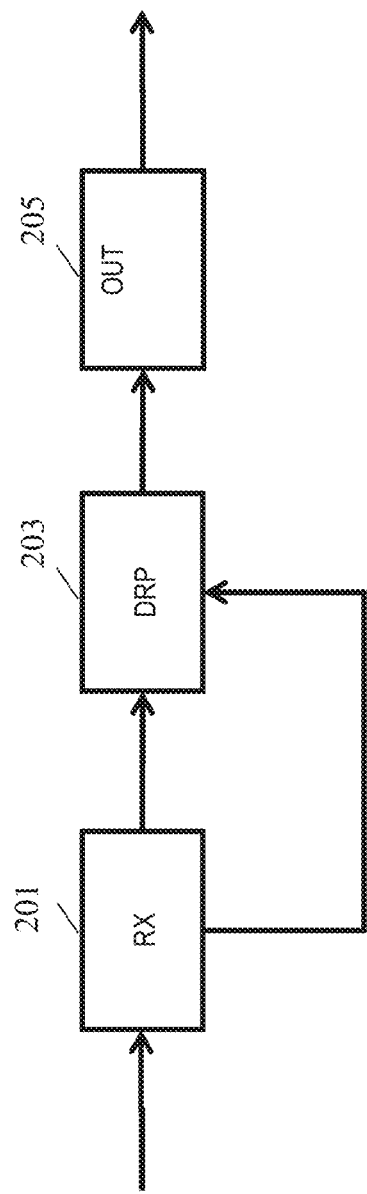
FIG. 2 is an illustration of an example of elements of an image processing apparatus.

FIG. 2 illustrates an example of elements of the image processing device 103 of FIG. 1.

The image processing device 103 comprises a receiver 201 which receives an image signal from the content provider apparatus 101. The image signal comprises one or more encoded images. In many scenarios the image signal may be a video signal comprising an encoded video sequence, i.e. a sequence of images. It will be appreciated that any suitable encoding of the image(s) may be used including for example JPEG image coding, MPEG video coding, etc. The encoded image is represented by pixel values which for each pixel of the image represents the corresponding light output for the pixel (or for individual color channel subpixel). The pixel values may be provided in accordance with any suitable color representation such as e.g. RGB, YUV etc.

The image signal furthermore comprises a target display reference which is indicative of a dynamic range of a target display for which the first encoded image is encoded. Thus, the target display reference provides a reference for the encoded image which reflects the dynamic range for which the received image has been constructed. The target display reference may indicate the luminances for which the tone mapping at the content provider apparatus 101 has been designed, and specifically optimized for.

The content provider apparatus 101 is thus arranged to generate an image signal which not only includes the encoded image itself but also a target display reference which represents the dynamic range of the display for which the encoded signal has been generated. The content provider apparatus 101 may specifically receive the encoded image from an internal or external source. E.g. the image may be provided as a result of a manual tone grading which optimizes the encoded image for a specific display. In addition, the content provider apparatus 101 may obtain information of the specific display that has been used for the optimization, e.g. via display information that has been automatically communicated to the content provider apparatus 101 from the display (e.g. the content provider apparatus 101 may also include the functionality required for supporting the manual tone mapping and may be connected to the target/reference display used for this tone mapping). As another example, the encoded tone mapped image may be received on a medium on which the properties of the associated display are also stored. As yet another example, the content provider apparatus 101 may receive information of a characteristic of the target display by a manual user input.

The content provider apparatus 101 may in response to such information generate an image signal which comprises both the encoded image(s) and target display reference which indicates a dynamic range of the target display that was used for the tone mapping. E.g. a data value corresponding to an identification of a white point luminance and optionally an Electro Optical Transfer Function corresponding to that of the target display may be included in the image signal by the content provider apparatus 101.

The image processing device 103 furthermore comprises a dynamic range processor 203 which applies the dynamic range transform to the received encoded image in order to generate an output image with a higher dynamic range, i.e. which corresponds to a larger range of output luminances when the image is rendered. Specifically, the input encoded image may be an image which is encoded for a LDR display with a maximum luminance white point of 500 nits and this may be transformed into an HDR output image with a maximum luminance white point of e.g. 1000 or 2000 nits. Typically, the dynamic range transform may also increase the number of bits used to represent each value but it will be appreciated that this is not essential and that in some embodiments the same number of bits (or indeed even fewer bits) may be used for the output image than for the input image. As another example, the input encoded image may be an image which is encoded for a HDR display with a maximum white point luminance of 2000 nits and this may be transformed into an LDR output image with a maximum white point luminance of e.g. 500 nits. Such a dynamic range reduction transform may also include a reduction in the number of bits used for the pixel values.

The dynamic range transform is performed in response to the target display reference and thus may be adapted to take into account not only the desired output luminance range but also the luminance range for which the received image has been encoded. For example, the system may adapt the dynamic range transform such that a transform to generate an output image for 1000 nits will be different depending on whether the input image is generated for a 300 nits or 500 nits image. This may result in a substantially improved output image.

Indeed, in some embodiments the input image may itself be an HDR image, such as e.g. a 1000 nits image. The optimal transformation of such an image into respectively a 2000 nits image and a 5000 nits image will typically be different and the provision of a target display reference may allow the image processing device 103 to optimize the dynamic range transform for the specific situation, thereby providing a substantially improved image for the specific display characteristics. Indeed, if the display is a 500 nits display, the dynamic range transform should perform a dynamic range compression rather than expansion.

The approaches may be particularly advantageous in inhomogeneous content distribution systems such as e.g. what is increasingly perceived for future television systems. Indeed the (peak) brightness of HDR LCD/LED TVs is currently rapidly increasing and in the near future, displays with a wide variety of (peak) brightness are expected to coexist in the market. Brighter pictures look nicer on the TV screen and a brighter TV sells better in the shop. On the other hand, "low end" displays in notebooks, tablets and smart phones are also becoming very popular and are also used for the rendering of e.g. TV content.

Since the display brightness (and typically the electro-optical transfer function that specifies how a display converts input pixel (color) driving values into light values which then provides a particular psychovisual impression to the viewer) is no longer known at the content generation side (and which is furthermore generally different from the reference monitor for which the content was intended/graded), it becomes challenging to provide the best/optimal picture quality on the display. Furthermore, whereas some variations in display brightness may have existed in the past, this variation was relatively minor and the assumption of a known fixed brightness did not introduce significant degradations (and could often be compensated manually be a user, e.g. by setting the brightness and/or contrast of a display).

However, due to the substantial increase in the variety of displays (smart phones, tablets, laptops, PC monitors, CRT displays, traditional LCD TV displays and bright HDR displays), the characteristics (especially brightness and contrast) of the displays used for rendering exhibit an enormous variation. For example, the contrast and peak luminance of state-of-the-art high-end display systems is continually increasing and new prototype displays have been developed with a peak luminance as high as 5000 cd/m2 and contrast ratios of 5-6 orders of magnitude. On the other hand displays being used in, for example smart phones and tablets, are becoming more and more popular but have relatively low performance characteristics.

As mentioned previously content, such as video for movies etc, is processed at the content creation side to provide desired rendered images. For example, when a movie is issued for general distribution (such as by DVD or Blu-ray™) the producers/studio typically adapts and customizes the images for optimal appearance on a specific display. Such a process is often referred to as color grading and tone mapping. Tone mapping may be considered as a non-linear mapping of a luma value of an input pixel to the luma value of an output pixel. The tone mapping is performed in order to match the video to the characteristics of the display, viewing conditions and subjective preferences. In case of local tone mapping, the processing varies depending on the position of the pixel within an image. In case of global tone mapping, the same processing is applied to all pixels.

For example, when converting content to be suitable for general consumer distribution, tone mapping is often performed to provide a desired output on a standard LDR display. This may be performed manually by color grading experts that balance many picture quality aspects to create the desired 'look' for the storyline. This may involve balancing regional and local contrasts, sometimes even deliberately clipping pixels. Thus, typically the tone mapping at this stage is not merely a simple automated conversion but is typically a manual, subjective and often artistic conversion.

If the content were graded for an HDR target display rather than for an LDR target display, the outcome of the tone mapping would typically be very different. Thus, when merely rendering the video content encoded for an LDR display on a HDR display, the resulting images will differ substantially from the optimal image. Similarly, if an HDR optimized image is merely rendered on an LDR display, a significant perceived image quality reduction may occur.

This issue is in the system of FIG. 1 addressed by the dynamic range transform being performed in the image processing device 103 but being based on information received preferably both from the content provider apparatus 101 and the display 107. In this way, the dynamic range transform (specifically a tone mapping algorithm) can be adapted to consider the characteristics of the tone mapping that was performed in the content provider apparatus 101 and to the specific luminance range of the display 107. Specifically, the tone mapping performed at the image processing device 103 can be dependent on the target display for which the tone mapping is performed at the content generation side.

The content provider apparatus 101 provides a target display reference to the image processing device 103 (either separately to or integrated with the encoded image, i.e. the image signal may be made up of two separate data communications). The target display reference may specifically include or be a white point luminance of the target display.

For example, for a relatively low complexity system, the content provider apparatus 101 may simply transmit an indication of the white point luminance of the target display for each the encoded image (video) that has been encoded. E.g., data may be communicated that indicates the number of nits available at the target display. The dynamic range transform can then adapt the transformation based on the number of nits. For example, if the image processing device 103 is performing a dynamic range transform to generate an output image for a 2000 nits display, the knowledge of whether the input image is tone mapped to a display of 500 nits or one of 1000 bits can be used to optimize the dynamic range transform performed at the image processing device 103. In both scenarios, the dynamic range transform may apply a non-linear transform but this non-linear transform may have different characteristics for the two scenarios, i.e. dependent on the white point of the target display used for the tone mapping at the content provision side.

Figure 3:
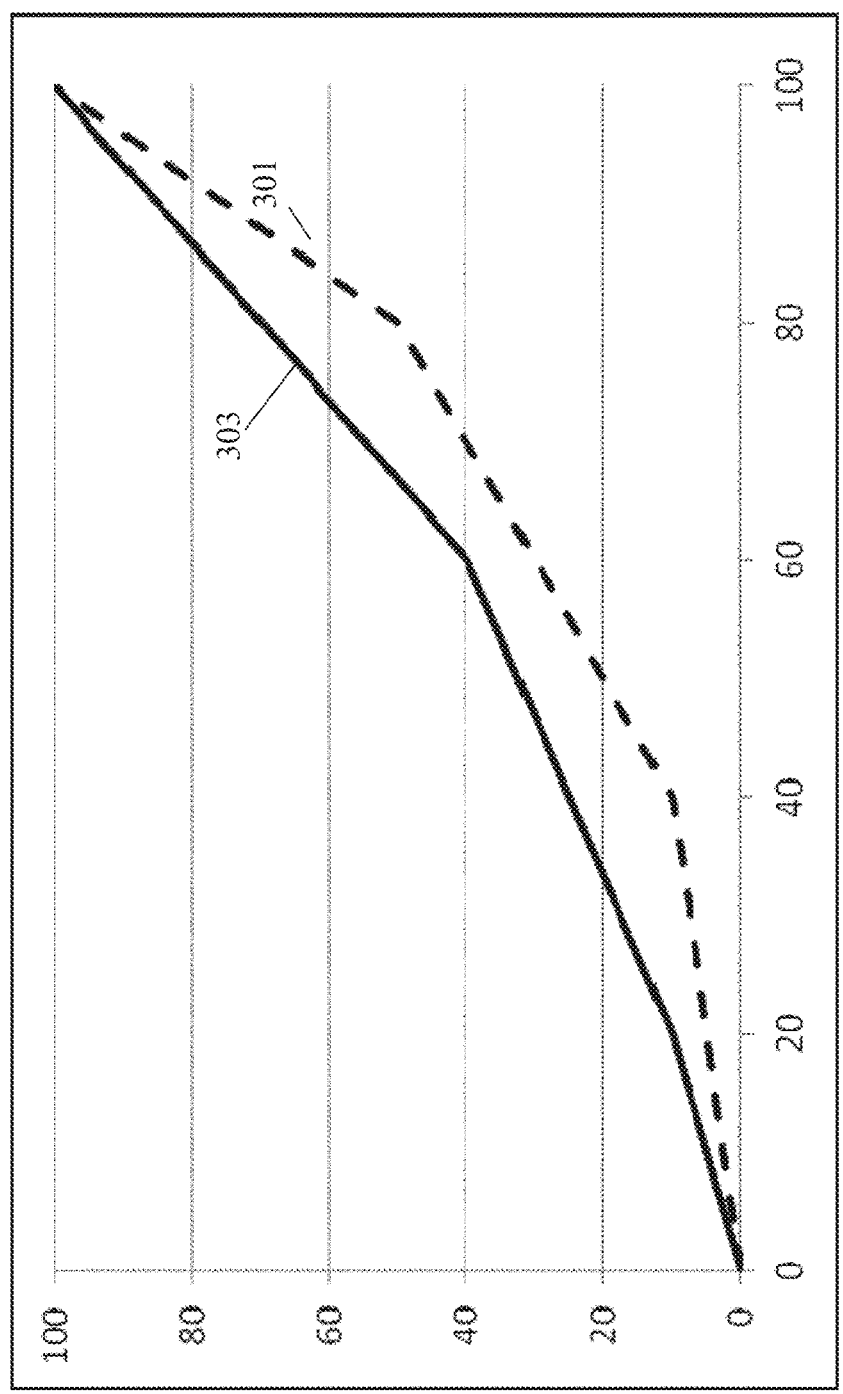
FIG. 3 illustrates an example of a mapping for an image processing apparatus.

For example, the following mapping between received LDR image pixels tone mapped for a 500 nits target display and the output HDR image pixels for a 2000 nits end-user display may be performed:
- 0-200 nits→0-200 nits
- 200-300 nits→200-600 nits
- 300-400 nits→600-1000 nits
- 400-500 nits→1000-2000 nits However, for a target display of 1000 nits, the following mapping may instead be performed:
- 0-200 nits→0-200 nits
- 200-700 nits→200-1000 nits
- 700-1000 nits→1000-2000 nits Thus, in terms of relative values (percentage of full mapping), the two different mappings may be as shown in FIG. 3 where the relationship between the percentage of white level for the input image on the x-axis relative to the percentage of white level for the output image on the y-axis is shown for respectively a 500 nit target display 301 and a 1000 nit target display. In the example, two very different non-linear tone mappings are applied for the same user display depending on the target reference display that was used/assumed at the content provision side.

It will be appreciated that the same mappings can be used for mapping from a 2000 nits optimized image to a 500 or 1000 nits optimized image by interchanging the axes (corresponding to applying an inverse mapping of that described above). It will also be appreciated that the mapping to e.g. a 500 nits optimized image may be adapted depending on whether the input image is a 1000, 2000 or 4000 nits optimized image.

In some embodiments, the target display reference may alternatively or additionally comprise an Electro Optical Transfer Function indication for the target display. For example, a gamma indication for the target display may be included.

Figure 4:
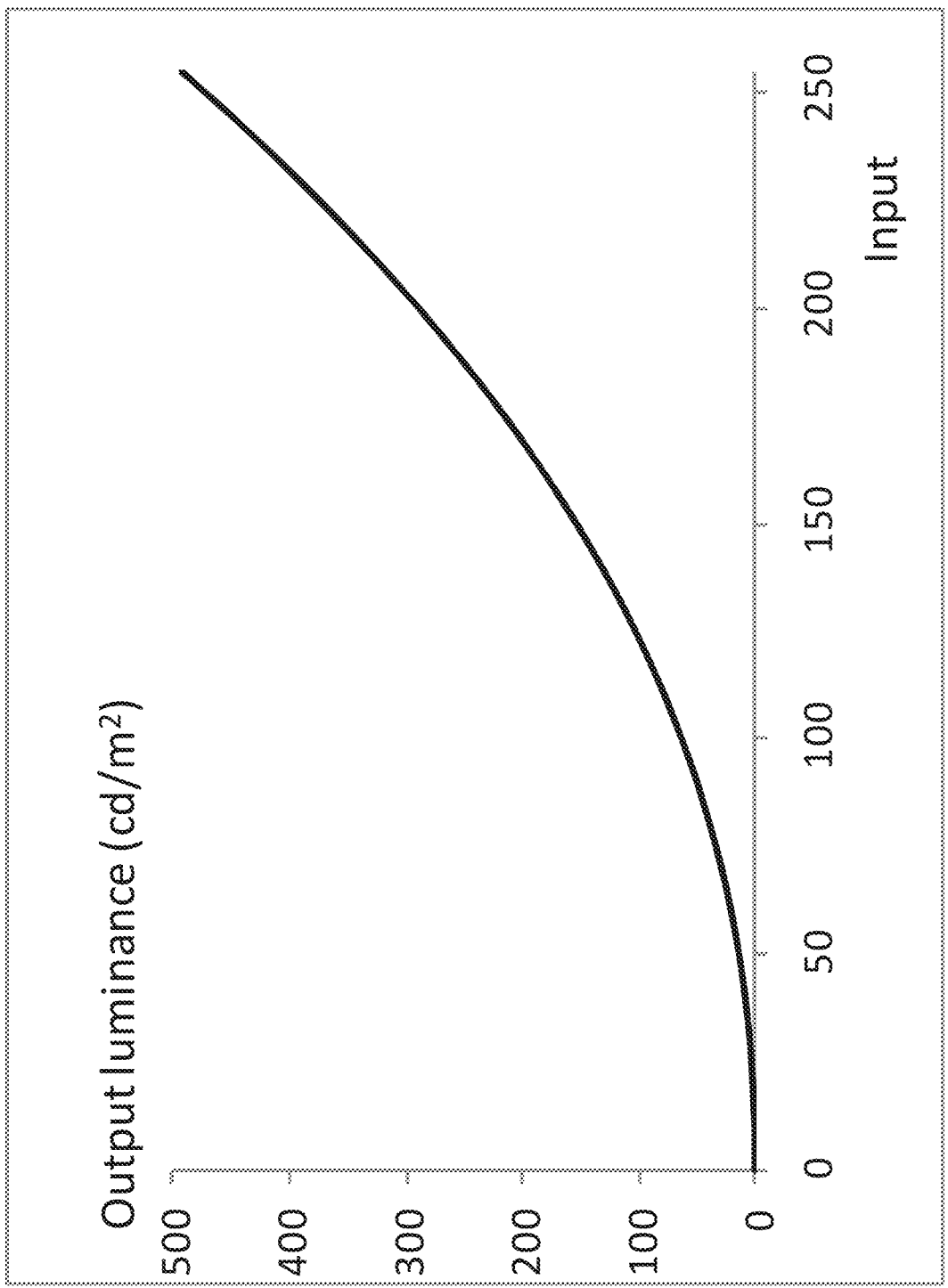
FIG. 4 illustrates an example of an Electro Optical Transfer Function (EOTF) for a display.

The Electro-Optical Transfer Function (EOTF) of a display describes the relationship between input (driving) luma value (Y') and output luminance (Y) for the display. This conversion function depends on many characteristics of the display. Also user settings like brightness and contrast may have great influence on this function. FIG. 4 illustrates a typical example of an EOTF for an 8 bit (256 level) input value.

The communication of an EOTF of the target display can provide an advantageous characterization of the target or reference display used to generate the encoded image or video. This characterization can then be used at the image processing device 103 to adapt the dynamic range transform to the differences between the characteristics of the target display and the end-user display. For example, the dynamic range transform may include a compensation that inverts a ratio between the EOTFs of the target/reference display and the end-user display.

It will be appreciated that there are many ways to characterize an EOTF. One possibility is to provide a set of sample values of the EOTF. The image processing device 103 may then interpolate between the sample points, e.g. using simple linear interpolation. Another possibility is to provide a specific model of grey scale/contrast behavior of the display at least over a part of the display range. As another example, the content provider apparatus 101 may communicate a specific mathematical function characterizing the EOTF. In some scenarios, a set of target displays may be predefined with the associated parameters of the model/function being stored locally in the image processing device 103. In that case the content provider apparatus 101 may only communicate the identification code of the target display to the image processing device 103.

As yet another example, an underlying mathematical function may be predetermined and the target display indication may comprise parameters for adapting the predetermined function to describe the specific target display EOTF. For example, the EOTF may be characterized by a gamma function as used for conventional displays, and the target display indication may provide a specific gamma for the target display.

In many systems, the target display indication may comprise or consist in a maximum luminance and a gamma of the target display. Thus, specifically, the characterization of the EOTF may be provided by two values, namely the gamma and the white point/maximum luminance The following descriptions will focus on such a scenario.

The description will also focus on embodiments wherein the distribution system is according to the Blu-ray™ standard. Blu-ray™ is a family of Audio/Video/Data distribution formats based on optical disc technology. BD-ROM™ is the acronym for Blu-ray Disc Read-only format. This format is predominantly used for distribution of high definition video (2D and 3D) and high quality audio.

Figure 5:
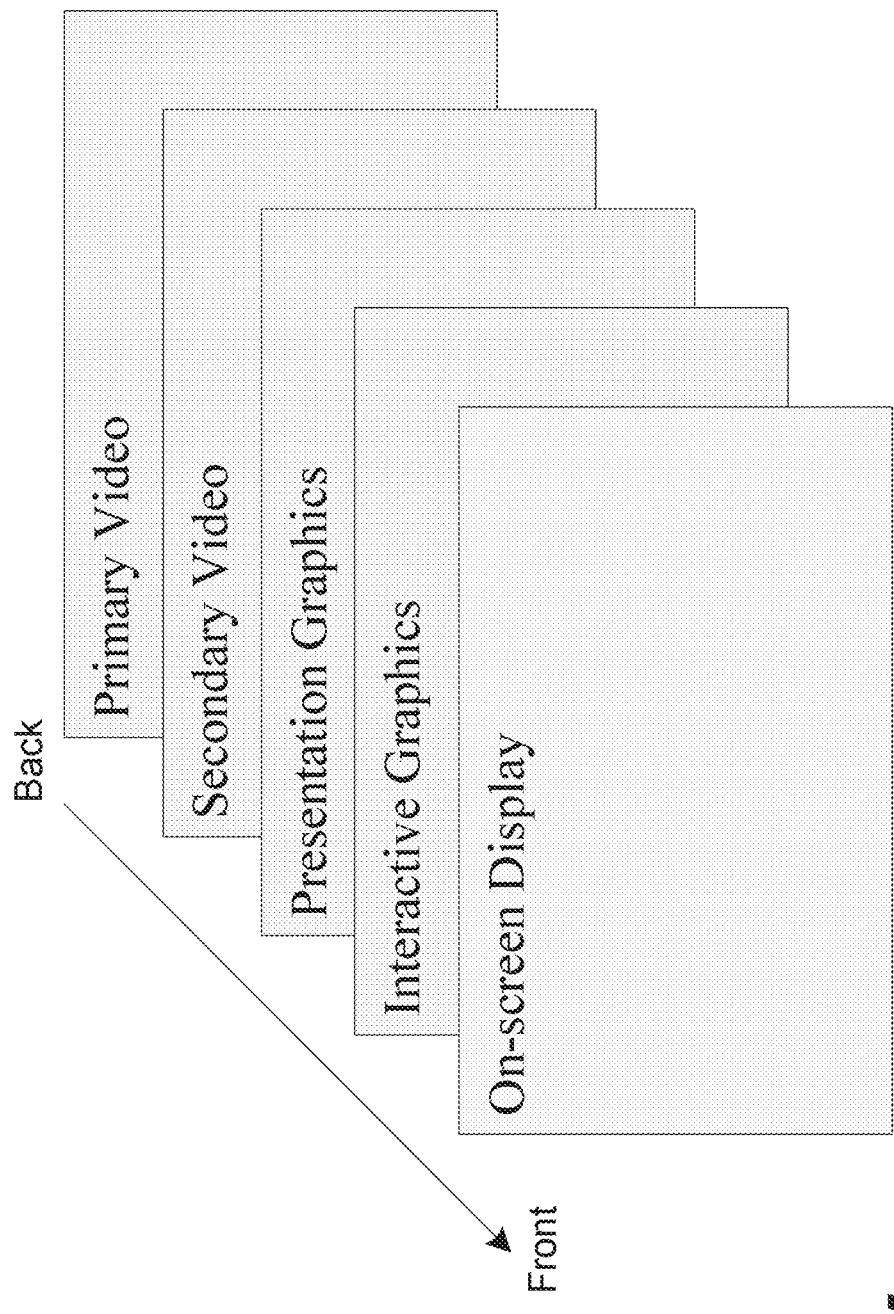
FIG. 5 illustrates an example of the model for presentation planes in the HDMV-2D mode of the Blu-ray™ standard.

A BD-ROM™ player features two modes of operation: HDMV and BD-J. At any point in time the player is either in HDMV mode or BD-J mode. Profile 5 Blu-ray™ players feature rendering of 3D stereoscopic Video/Graphics next to the standard 2D Video/Graphics rendering. As an example FIG. 5 shows the model for presentation planes in the HDMV-2D mode.

As a specific example of the system of FIG. 1, the image signal may be a video signal encoded on a BDROM™ and thus the image processing device 103 may specifically be a Blu-ray™ player. The encoded video may be the primary or optionally the secondary video content on the disc. The primary video is typically the actual movie in 2D or possibly in 3D stereoscopic format.

In order to achieve optimal picture quality in the BDROM™ system, the system of FIG. 1 uses an augmentation to the BDROM™ specification which allows for transmission of a target display parameters. This data together with the assumed or actual information of the end-user display, is then used by the BDROM™ player to perform the dynamic range transform. Specifically, the BDROM™ player (the image processing device 103) may perform additional video tone mapping or other processing depending on the characteristics of the target display and/or the end-user display.

One option for transmitting information on the parameters of the target display is by embedding data indicative of these parameters values in the BDROM™ data on the disc. An extension data structure in the playlist file (xxxxx.mpls) can be used for this. This extension data structure will have a unique and new identification. Incompatible legacy BDROM™ players will be ignorant of this new data structure and will merely ignore it. This will guarantee backward compatibility. A possible implementation of the syntax and semantics of such a Target_Display_descriptor is shown below.

| Syntax | No. of bits | Mnemonics |
|---|---|---|
| Target_Display_Descriptor ( ) { | | |
| Abs_Max_Luminance | 8 | uimsbf |
| Gamma (or grey value behavior model of the display e.g. EOTF) | 8 | uimsbf |
| } | | |

In this example, Abs_Max_Luminance is a parameter with a value e.g. between 0 and 255 that indicates the Absolute maximum luminance/white point of the target display according to:

$$\text{Absolute maximum luminance in cd/m2} = \text{Abs\_Max\_Luminance } [bit0\text{-}4] \times 10^{Abs\_Max\_Luminance\ [bits\text{-}7]}.$$

It will be appreciated that other amounts of bits for mantissa or exponent may of course be used.

Gamma is a parameter with a value e.g. between 0 and 255 that indicates the gamma of the target display according to:

$$\text{Gamma of the Target Display EOTF} = \text{Gamma}/25.$$

Thus, in this example a target display reference is provided to the image processing device 103 by the BDROM™ including an absolute maximum luminance and a gamma value for the target display for which the video signal has been generated. The image processing device 103 then uses this information when performing an automatic dynamic range transform to increase or decrease the dynamic range of the video signal for a higher/lower luminance end-user display.

It will be appreciated that many different dynamic range transforms are possible and that many different ways of adapting such dynamic range transforms based on the target display references may be used. In the following, various examples are provided but it will be appreciated that other approaches may be used in other embodiments.

Figure 6:
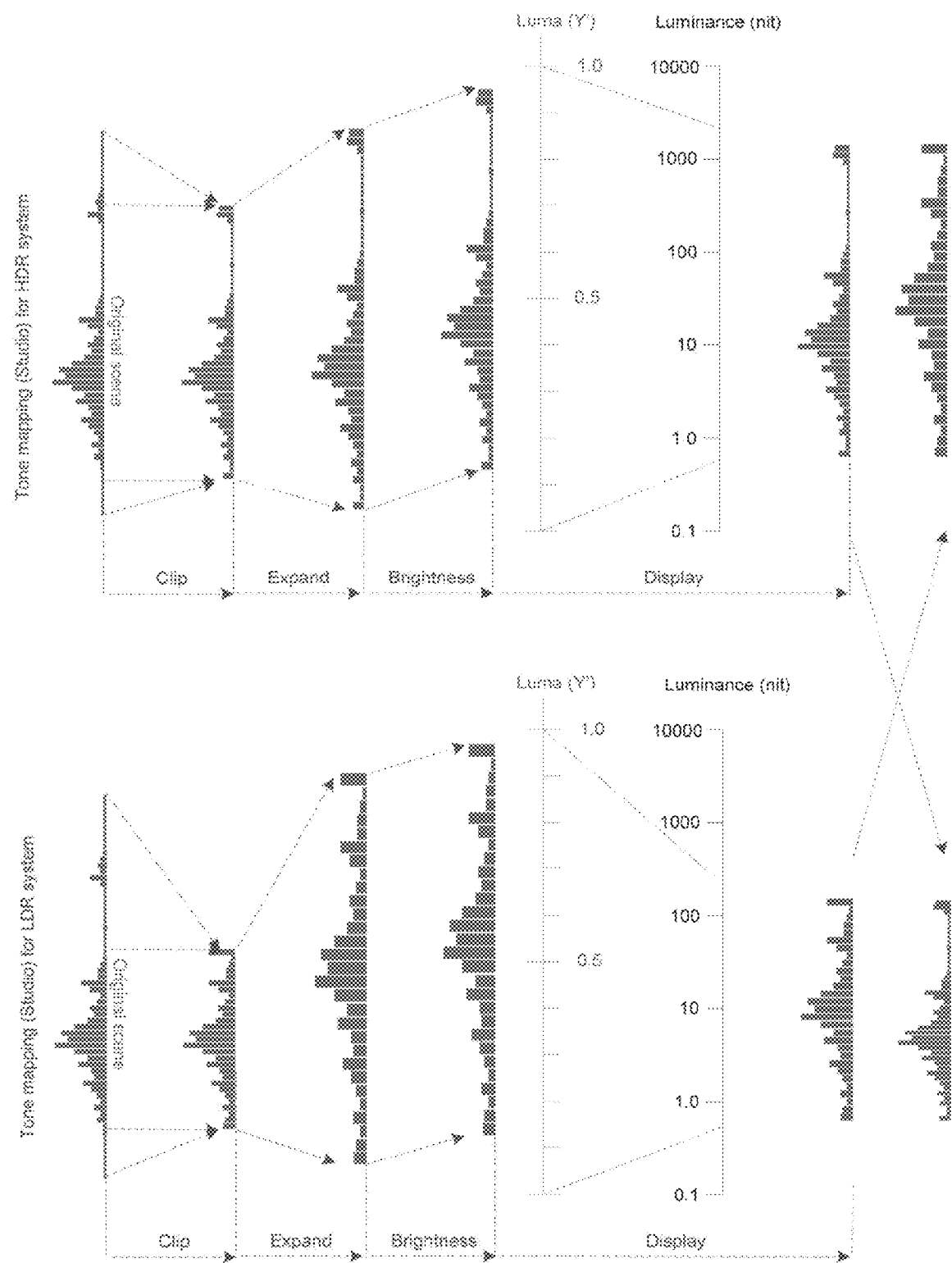
FIG. 6 illustrates an example of dynamic range processing for HDR and LDR images.

Firstly, the difference in the optimum mapping of a given original image to respectively an LDR and an HDR image may be illustrated by FIG. 6 which shows an example of the different tone mapping that may be used for an LDR display (lower part of the figure) and an HDR display (upper part of the figure). The original image is the same for both LDR and HDR. The histogram of this image is shown at the left of FIG. 6. It shows that most pixels have luma values in the low-mid range. The histogram also shows a second, small peak at high luma values (e.g. headlights of a car or a flashlight).

In this example, tone mapping is represented by three successive processing steps:
 Clipping: Mapping of luma values in the low and high range to a limited number of output luma values.
 Expanding: Adapting the dynamic range to the desired luma dynamic range.
 Brightness: Adapting the average luminance level for optimal brightness.

In the LDR case, the luma range is mapped to a luminance range of an LDR display. The dynamic range of the original image is much larger and thus the original image is severely clipped in order to accommodate for the limited dynamic range of the display.

In the HDR case (upper part of the figure) the clipping can be less severe because the dynamic range of the display is an order of magnitude larger than for the LDR display.

FIG. 6 shows the histogram after each processing steps as well as the histogram of the image shown on the LDR and HDR display respectively. In particular, the rightmost histograms illustrate the LDR tone mapped image when shown on a HDR display and vice versa. In the first case the image will be too bright and the low and high range luma values will lose too much detail. In the second case the image will be too dark and the middle range luma values lose too much detail and contrast.

As can be seen, merely presenting a (luminance scaled version of) the LDR optimized image on an HDR display (or vice versa) may substantially reduce image quality, and therefore the image processing device 103 may perform a dynamic range transform to increase the image quality. Furthermore, since the optimization performed at the studio depends strongly on the characteristics of the display for which the optimization has been performed, the optimum dynamic range transform to be performed by the image processing device 103 does not merely depend on the end-user display but also depends on the reference display. Accordingly, the target display reference provided to the image processing device 103 allows the image processing device 103 to perform the desired dynamic range transform not merely based on the assumed or known characteristics of the end-user display, but also based on the actual display used at the content provider side. Indeed, it can be considered that the provision of the target display reference allows the image processing device 103 to partially or fully reverse some of the tone mapping performed at the studio side thereby allowing estimation of characteristics of the original image. Based on this estimation, the image processing device 103 can then apply a desired tone mapping optimized for the specific dynamic range characteristics of the end-user HDR display.

It will be appreciated that the image processing device 103 typically does not seek to perform a specific inverse tone mapping to recreate the original signal followed by a tone mapping suitable for the specific end-user display. Indeed, typically the dynamic range transform will not provide sufficient information to perform such inverse tone mapping and the tone mapping performed by the content provider may often be partially irreversible. However, the image processing device 103 may perform a dynamic range transform which seeks to adapt the received image by the dynamic range transform providing a result that may be a (possibly very coarse) approximation of the more theoretical operation of an inverse tone mapping to generate the original image followed by an optimized tone mapping of the original image to the specific desired dynamic range. Thus, the image processing device 103 may simply apply e.g. a simple mapping from luma values of the input to the dynamic range transform to appropriate luma values at the output of the transformation. However, this mapping not only reflects the desired tone mapping of the original image for the given end-user display but also depends on the actual tone mapping already performed at the content provider apparatus 101. Therefore, the image processing device 103 may use the dynamic range transform to adapt the applied transform to take into account and adapt to the tone mapping that has already been performed.

Figure 7:
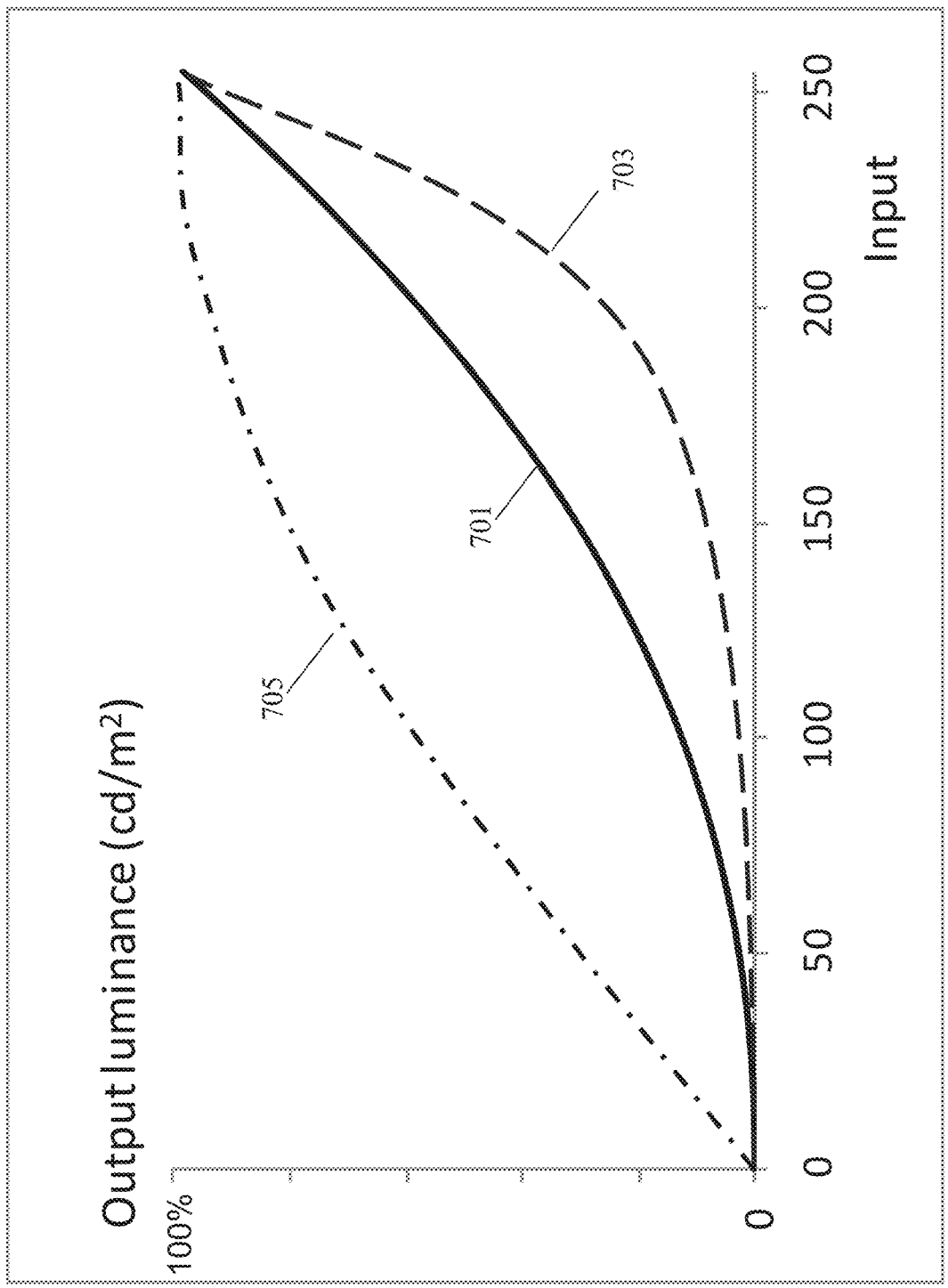
FIG. 7 illustrates an example of a mapping for an image processing apparatus.
Figure 8:
FIG. 8-10 illustrate examples of images with different dynamic range transforms when presented on the same display.

As an example, the image processing device 103 may be arranged to provide an output image for display on an HDR image with a predetermined maximum luminance (say 4000 nits). The received image/video may be tone mapped for an LDR display of 500 nits. This tone mapping has thus optimized the image for a given maximum luminance and gamma. As a specific example, the gamma function may be as curve 701 of FIG. 7 and the resulting image when presented on a 500 nits display may be as FIG. 8.

Figure 9:

When this image is to be presented on an HDR display of e.g. 4000 nits, it is often desirable that the light output for dark areas does not change substantially whereas the light output for bright areas should be increased very substantially. Thus, a very different relationship between (linear) luminance values and actual drive values are required. Specifically, a substantially improved image would have been generated for an HDR image if the mapping curve 703 of FIG. 7 had been used, i.e. if a higher gamma had been applied at the content side tone mapping. However, this higher mapping will on a 500 nits display result in images that appear to be too dark as illustrated in FIG. 9.

In the system, the image processing device 103 is informed of the gamma value for the target display at the content side, and it can thus derive curve 701. Furthermore, the desired curve 703 is known as it depends on the display dynamic range for which the output image is generated (which e.g. may be provided to the image processing device 103 from the display 107 or may be assumed/predetermined). Thus, the image processing device 103 can apply a transformation to each pixel luminance value corresponding to the conversion from curve 701 to curve 703. In this way, the image processing device 103 can thus proceed to use the target display reference provided from the content provider apparatus 101 to apply a dynamic range transform which converts the generated output signal from one suitable for an LDR display to one suitable for an HDR display.

Figure 10:

It will be appreciated that the same considerations may apply when performing the dynamic range transform to reduce the dynamic range. For example, if the received content is to be displayed on a low quality, low luminance display, such as a mobile phone display, the preferred gamma for the mapping curve may be as indicated by curve 705 of FIG. 7, i.e. a gamma of less than one may be preferred. When presented on a normal 500 nits LDR, a corresponding image would appear to be too bright and have too little contrast as indicated by FIG. 10, and indeed the scenario would be even worse for an HDR display.

Thus, if the image processing device 103 is generating an image for such a low brightness display, it may proceed to perform a dynamic range transform that reduces the dynamic range by adjusting the luminance values for the differences in the gamma between curve 701 and 705.

As another example, if the content provider apparatus 101 provides an image intended for a low brightness/dynamic range display and accordingly an image which is encoded according to curve 705, the image processing device 103 can use the knowledge of this gamma provided by the dynamic range transform to transform the received values to values suitable for either a 500 nits display by adapting for the difference between curves 705 and 701, or for a 4000 nits display by adapting for the difference between curves 705 and 703.

Thus, the provision of a dynamic range transform indicating a maximum luminance/white point luminance and a gamma value assumed for the target display allows the image processing device 103 to convert the received image to a gamma value suitable for the specific brightness luminance value of the display on which the image is to be rendered.

In some systems, the target display reference may comprise a tone mapping indication representing a tone mapping used to generate the first encoded video stream for the first target display.

In some systems, the target display reference may directly provide information of some of the specific tone mapping that has been performed at the content provider side. For example, the target display reference may include information that defines the white point luminance and gamma for which the LDR (or HDR) image has been generated, i.e. the display for which the tone mapping has been performed. However, in addition, the target display reference may provide some specific information that e.g. defines some of the information lost in the tone mapping that has been performed at the content provider side.

E.g. in the example of FIG. 6, an LDR tone mapped image corresponding to the clipped image may be received by the image processing device 103. The image processing device 103 may apply a dynamic range transform which maps this to the appropriate dynamic range and non-linear relation based on information of the target display gamma and white point. However, in order to provide an improved adaptation, the severe clipping used for the LDR image should preferably be translated into a less severe clipping (or indeed in some scenarios to no clipping). Accordingly, the content provider apparatus 101 may provide additional information that identifies the specific clipping that has been performed for the LDR image by the content provider thereby allowing the clipping to be partially or fully reversed. For example, the dynamic range transform may define the range which has been clipped and the image processing device 103 may accordingly distribute the clipped values over this range in accordance with a suitable algorithm (e.g. identifying an area of clipped values (such as an explosion) and generating an increasing brightness towards the center of this area).

The dynamic range transform may alternatively or additionally provide information that defines an additional tone mapping that has been performed at the content provider side. For example, a relatively standard tone mapping may be performed for most images of a movie or other video sequence. The image processing device 103 may, based on the gamma and white point luminance, convert such a tone mapped image to a desired (higher or lower) dynamic range image using a dynamic range transform that assumes a standard tone mapping at the content provider side. However, for some images the content provider may have performed a dedicated and subjective tone mapping. For example, the color grader may desire a specific artistic effect or quality for some images, such as e.g. a fine graduation or color cast for dark images of a tense situation (say in a horror move) or a specific effect for dream like scenes. This tone mapping can be characterized by data in the target display reference thereby allowing the image processing device 103 to adapt the dynamic range transform to the specific tone mapping that has been applied.

Thus, specifically, in some scenarios additional/modified tone mapping is performed at the content provider side to generate a specific look such that the image is modified relative to that which would be expected by a fixed adaption to the naked electro-optical behavior of the target display. The data provided by the content provider apparatus 101 may specify a desired look compared to the reference display and this can by the image processing device 103 be used to actually generate the desired optical behavior given all factors (e.g. whereas a blind coding in the input signal could accidentally end up below the reflected surround light such that it can no longer be compensated according to the encoded content provider side behavior).

As an example, if it is known that the gamma of the target display is low for the darker values, it is for such a (reference) display possible to fine tune the look of, say, horror scenes. E.g. the image may be compensated by an extra luminance boosting so that the image still appear darkish but at least with some object structure still being visible.

As an example, together with the gamma and white point luminance of the reference target, the color grader at the content provision side may provide some (additional) information about the artistic impression of certain regions and/or images. For example, for a given EOTF, the content provider may indicate that a certain area is desired to have increased brightness for better visibility, or decreased contrast to provide a foggy look etc. Thus, together with an EOTF (e.g. represented by gamma and white point luminance) the target display reference may indicate boundaries of a local/partial display luminance range and provide dynamic range transform data that provides more precise info on the preferred allocation of the grey levels therefor.

In some embodiments, the dynamic range processor (203) may be arranged to select between generating the output image as the received encoded image and generating the output image as a transformed image of the first encoded image in response to the target display reference.

Specifically, if the white point luminance indicated by the target display reference is sufficiently close to the white point luminance of the end-user display, the dynamic range transform may simply consist in not performing any processing on the received encoded image, i.e. the input image may simply be used as the output image. However, if the white point luminance indicated by the target display reference is different to the white point luminance of the end-user display, the dynamic range transform may modify the received image in accordance with a suitable mapping of the received image pixels to output image pixels. In such cases, the mapping may be adapted depending on the target display reference. In other examples, one or more predetermined mappings may be used.

For example, the image processing device 103 may include a predetermined first mapping which has been determined to provide a suitable output image for a doubling in the white point luminance level and a predetermined second mapping which has been determined to provide a suitable output image for a halving of the white point luminance level. In such an example, the image processing device 103 may select between the first mapping, the second mapping, and a unity mapping dependent on the white point luminance of the target display reference and the white point of the end-user display. The image processing device 103 may specifically select the mapping which most closely corresponds to the ratio between the target display reference white point luminance and the end-user display white point luminance.

For example, if an input image is received with a target display reference indicating that it has been optimized for a 500 nits display and the end-user display is a 1000 nits display, the image processing device 103 will select the first mapping. If instead, the target display reference indicates that the input image has been optimized for a 1000 nits display, the image processing device 103 will select the unity mapping (i.e. use the input image directly). If the target display reference indicates that it has been optimized for a 2000 nits display, the image processing device 103 will select the second mapping.

If in-between values for the white point luminance of the target display are received, the image processing device 103 may select the mapping closest to the ratio between the white point luminances, or may e.g. interpolate between the mappings.

In some embodiments, the dynamic range transform may comprise or consist in a gamut transform. Thus, in some embodiments, the dynamic range processor 203 may modify chromaticities of the rendered image depending on the target display reference. For example, when a received HDR image is rendered on an LDR display the compression may result in a blander image with fewer variations and gradations in individual image objects. The dynamic range transform may compensate for such reductions by increasing chroma variations. For example, when an image with a brightly lit apple is optimized for rendering on an HDR display, the rendering on an LDR display with reduced dynamic range will typically make the apple appear to stand out less and to appear less clear and duller. This may by the dynamic range transform be compensated for by making the color of the apple more saturated. As another example, the texture variations may become less perceptually significant due to the reduced luminance variations and this may be compensated by increasing the chroma variations of the texture.

In some systems, the video signal may comprise a data field which includes dynamic range transform control data and the dynamic range processor 203 may adapt the dynamic range transform in response to this control data. This may be used by the content owner/provider to retain at least some input to or control over the rendering of the provided content.

The control data may for example define an operation or parameter of the dynamic range transform that must be applied, may be applied, or which is recommended to be applied. The control data may furthermore be differentiated for different end-user displays. For example, individual control data may be provided for a plurality of possible end-user displays, such as one set of data for a 500 nits display, another set for a 1000 nits display, another set of a 2000 nits display, and yet another set for a 4000 nits display.

Figure 11:
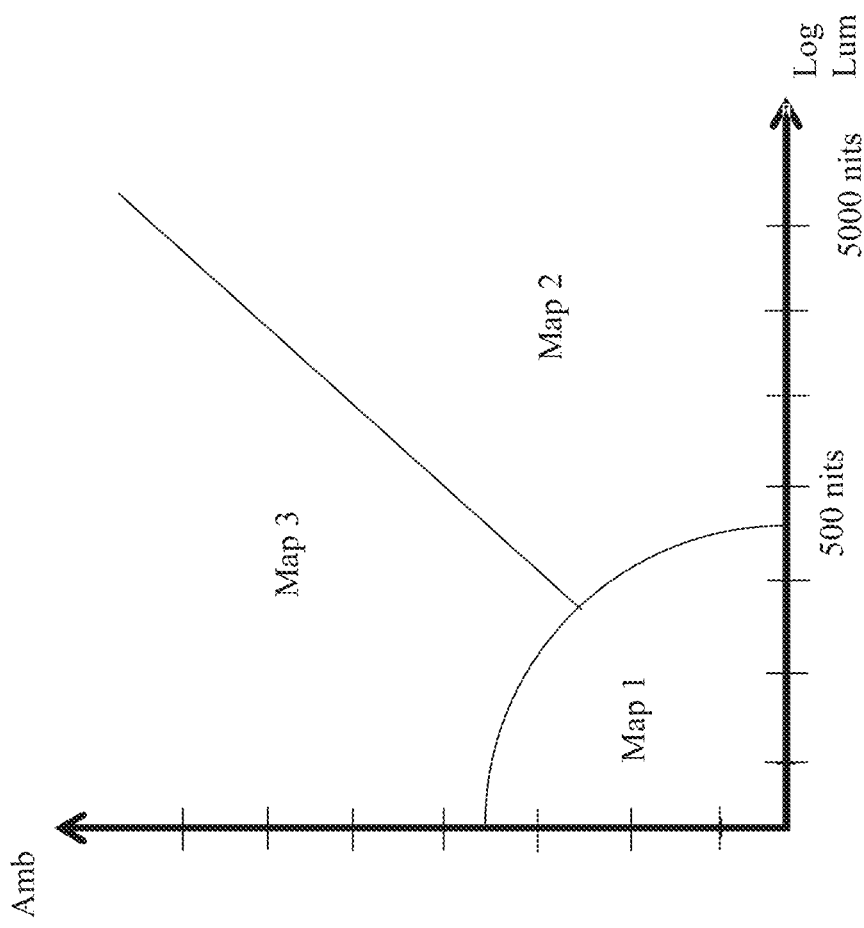
FIG. 11 illustrates an example of a relationship between luminance values and possible mappings for an image processing apparatus.

As an example, the content creator may specify which tone mapping should be performed by the dynamic range processor 203 depending on the end-user display characteristics as illustrated in FIG. 11. In the example, the control data may specify a mapping for each of three areas corresponding to given values of the maximum luminance of the display (x-axis) and the ambient light incident on the display (and thus the reflections from the display—y-axis).

Thus, in the specific example mapping 1 is used for low brightness displays in low ambient light environments. Mapping 1 may simply be a unity mapping, i.e. the received LDR image may be used directly. For a high maximum luminance (HDR) display in a relatively dark ambient environment (low screen reflections), mapping 2 may be used. Mapping 2 may perform a mapping which extends the bright luminances of the LDR image further while substantially maintaining the intensity for the darker segments. For a high maximum luminance (HDR) display in a relatively bright ambient environment (substantial screen reflections), mapping 3 may be used. Mapping 3 may perform a more aggressive mapping which not only extends the bright luminances of the LDR image but also brightens and increases contrast for the darker image areas.

In some scenarios, the control data may specify the boundaries between the mappings with the mappings being predetermined (e.g. standardized or known at both the content provider side and at the renderer side). In some scenarios, the control data may further define elements of the different mappings or may indeed specify the mappings precisely, e.g. using a gamma value or specifying a specific transformation function.

In some embodiments, the dynamic range transform control data may directly and explicitly specify the dynamic range transform that should be performed to transform the received image to an image with a different dynamic range. For example, the control data may specify a direct mapping from the input image values to output image values for a range of target output display white points. The mapping may be provided as a simple parameter allowing the appropriate transform to be realized by the dynamic range processor 203 or detailed data may be provided such as a specific look up table or mathematical function.

Figure 12:
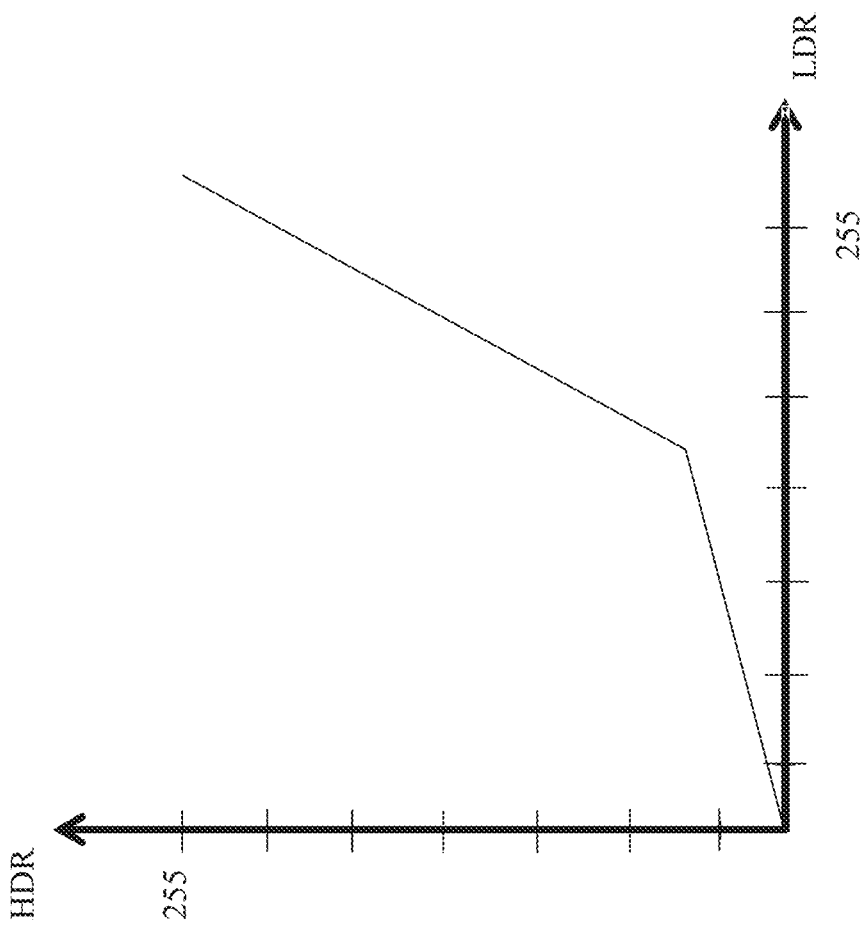
FIG. 12 illustrates an example of a mapping for an image processing apparatus.

As a low complexity example, the dynamic range transform may simply apply a piecewise linear function to the input values of an LDR image to generate improved HDR values. Indeed, in many scenarios, a simple mapping consisting of two linear relationships as illustrated in FIG. 12 can be used. The mapping shows a direct mapping between input pixel values and output pixel values (or in some scenarios the mapping may reflect a (possibly continuous) mapping between input pixel luminances and output pixel luminances). It will be appreciated that the same mapping may be used to map from an input HDR image to an output LDR image.

Specifically, for a mapping from LDR to HDR, the approach provides a dynamic range transform which maintains the dark areas of an image to remain dark while at the same time allows the substantially increased dynamic range to be used to provide a much brighter rendering of bright areas, as well as indeed an improved and more lively looking midrange. For a mapping from HDR to LDR, the approach provides a dynamic range transform which maintains the dark areas of an image but compresses the brighter areas to reflect the reduced brightness range of the display.

However, the exact transformation depends on the target display for which the image was generated and on the display on which it is to be rendered. For example, when rendering an image for a 500 nits display on a 1000 nits display, a relatively modest transformation is required and the stretching of the bright areas is relatively limited. However, if the same image is to be displayed on a 5000 nits display, a much more extreme transformation is required in order to fully exploit the available brightness without brightening the dark areas too much.

Figure 13:
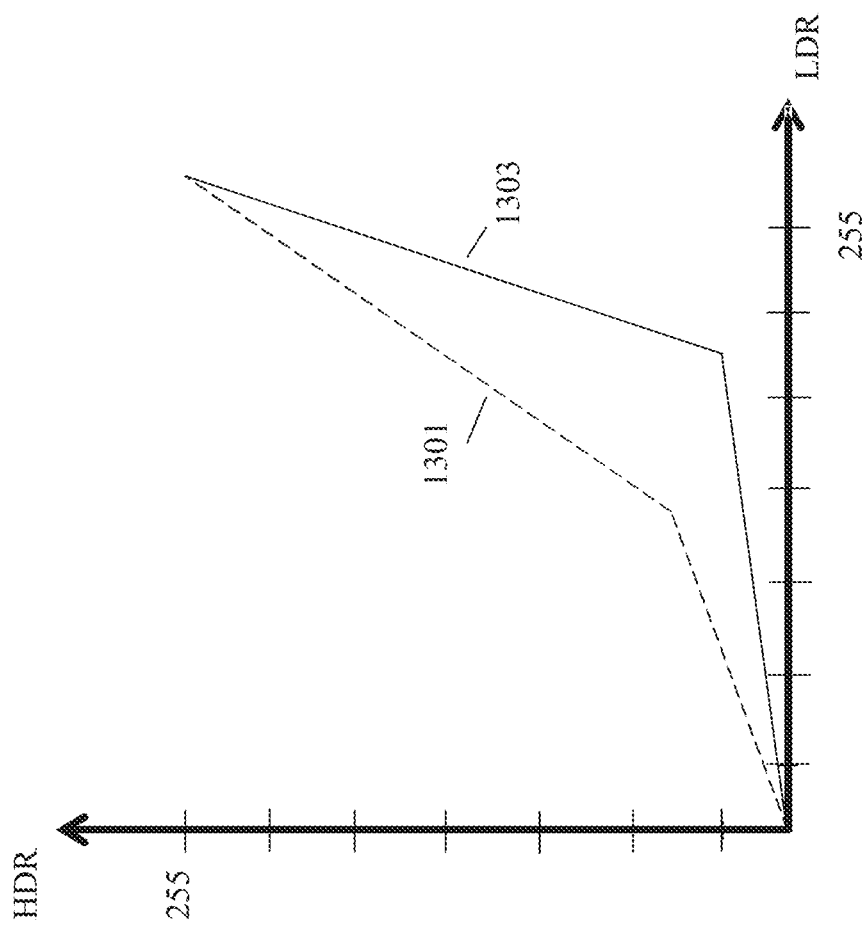
FIG. 13 illustrates an example of a mapping for an image processing apparatus.

Likewise the mapping may depend on the target display for which the original image was generated. For example, if an input image optimized for 1000 nits is to be rendered on a 2000 nits display, a relatively modest transformation is required and the stretching of the bright areas is relatively limited. However, if an image has been optimized for 500 nits display and is to be displayed on a 2000 nits display, a much more extreme transformation is required in order to fully exploit the available brightness without brightening the dark areas too much. FIG. 13 illustrates how two different mappings may be used for respectively a 1000 nits input image (curve 1301, maximum value of 255 corresponding to 1000 nits) and a 500 nits input image (curve 1303 maximum value of 255 corresponding to 500 nits) for display on a 2000 nits LDR input image (maximum value of 255 corresponding to 2000 nits).

An advantage of such a simple relationship is that the desired tone mapping may be communicated with a very low overhead. Indeed, the control data may specify the knee of the curve, i.e. the point of the transition between the two linear pieces. Thus, a simply two component data value may specify the desired tone mapping to be performed by the image processing device 103 for different displays. The image processing device 103 may further determine suitable values for other maximum luminance values by interpolating between the provided values.

In some implementations, more points may e.g. be provided to define a curve which is still piecewise linear but with more linear intervals. This may allow a more accurate tone mapping and improve the resulting image quality while only introducing a relatively minor overhead.

In many implementations, the control data may not specify a specific tone mapping that should be performed but rather provide data which defines boundaries within which the dynamic range transform/tone mapping may be freely adapted by the image processing device 103.

For example, rather than specify a specific transition point for the curves of FIGS. 12 and 13, the control data may define limits for the transition point (with possibly different limits being provided for different maximum brightness levels). Thus, the image processing device 103 may individually determine desired parameters for the dynamic range transform such that this can be set to provide the preferred transition for the specific display taking into account e.g. the specific user preferences. However, at the same time the content provider can ensure that this freedom is restricted to an acceptable range thereby allowing the content provider to retain some control over how the content is rendered.

Thus, the dynamic range transform control data may include data that defines transform parameters that must be applied by the dynamic range transform performed by the dynamic range processor 203 and/or which define limits for the transform parameters. The control data may provide such information for a range of maximum brightness levels thereby allowing adaptation of the dynamic range transform to different end-user displays. Furthermore, for maximum brightness levels not explicitly included in the control data, appropriate data values may be generated from the available data values, e.g. by interpolation. For example, if a knee point between two linear pieces is indicated for a 2000 nits and a 4000 nits end-user display, a suitable value for a 3000 nits display may be found by simple interpolation (e.g. by a simple averaging in the specific example).

It will be appreciated that many different and varied approaches for both the dynamic range transform and for how to restrict, adapt and control this from the content provider side by additional control data may be used in different systems depending on the specific preferences and requirements of the individual application.

Indeed, many different commands or parameter values can be provided in the control data to generate tone mappings in accordance with the preferences of the content provider.

For example, in low complexity systems, a simple dynamic range transform may be applied and the content provider apparatus 101 may simply provide a white level and black level for the target display which is then used by the dynamic range processor 203 to determine the tone mapping to apply. In some systems a tone mapping function (gamma or otherwise) may be provided as mandatory for mapping at least one range of the input image. For example, the control data may specify that darker and/or midranges must be rendered in accordance with a given mapping while allowing brighter ranges to be mapped freely by the image processing device 103.

In some scenarios, the control data may merely provide a suggestion of suitable mapping that can be applied e.g. in the midrange area. In such a case, the content provider may thus assist the image processing device 103 in providing suggested dynamic range transform parameters which have been found (e.g. through manual optimization by the content provider) to provide a high image quality when viewed on a given HDR display. The image processing device 103 may advantageously use this but is free to modify the mapping e.g. to accommodate for individual user preferences.

In many scenarios the mapping is at least partially performed based on control data will represent a relatively low complexity functional relationship, such as a gamma mapping, S-curve, combined mapping defined by partial specifications for individual ranges etc. However, in some scenarios more complex mappings may of course be used.

It will also be appreciated that the dynamic range transform may often include an increase or decrease in the number of bits used to represent the values. For example, an eight bit image may be transformed into a 12 or 14 bit image. In such cases, the control data from the content provider apparatus 101 may be provided independently of the changed quantization. For example, an 8 bit to 8 bit co-encoded tone mapping ("shape" for grey-sub-distribution) may be defined by the content provider apparatus 101 and the image processing device 103 may scale this mapping to the specific display white brightness by taking into account the transformation to more bits.

In other embodiments or scenarios, the dynamic range transform may include a decrease in the number of bits used to represent the values. For example, a 12 bit image may be transformed into an 8 bit image. Such scenarios may often occur when a reduction in the dynamic range is provided by the dynamic range transform, e.g. when converting a 12 bit HDR image to be rendered on an 8 bit input value LDR display.

As mentioned, the control data may provide mandatory or voluntary control data. Indeed, the received data may include one or more fields that indicate whether the tone mapping parameters provided are mandatory, allowed, or suggested.

For example, a suggested tone mapping function may be provided together with an indication of how large a deviation therefrom can be accepted. An image processing device 103 in a standard configuration may then automatically apply the suggested mapping. However, the transform may be modified e.g. to reflect a user's personal preferences. For example, a user input may change the settings of the image processing device 103, e.g. such that the dark areas of an image are rendered brighter than considered ideal by the content provider. E.g. a user may simply press a button for increasing brightness, and the tone mapping may be changed accordingly (e.g. the lower linear section of the curves of FIGS. 12 and 13 are moved upwards). The user may thus introduce a fine tuning to the tone mapping. However, data of how much fine tuning is acceptable to the content provider may be included in the control data thereby restricting the dynamic range transform to generate output images that are still considered by the content provider to retain the integrity of the image being provided. The control data may e.g. also specify the effect of the user interactions, such as e.g. define or limit the change in brightness that occurs for each press of the button by a user.

The dynamic range transform accordingly provides a dynamic range transform which is intended to provide an image which is appropriate for the specific end-user display 107 while taking into account the display characteristics of the display for which the input image is generated. Thus, the image processing device 103 generates an output signal that is associated with a given maximum luminance/brightness value, i.e. which is intended for rendering on a display with that white point/maximum luminance value. In some systems, the white point luminance of the display may not be accurately known to the image processing device 103, and thus the output signal may be generated for an assumed white point luminance (e.g. entered manually by a user). In other applications (as will be described later), the display may provide information on the white point luminance and the image processing device 103 may adapt the dynamic range transform based on this information.

If the white point luminance for which the output signal is generated corresponds exactly or sufficiently closely to the white point luminance of one of the received images (according to any suitable criterion, such as a difference the white point luminances being below a threshold), the image processing device 103 may proceed to use this image directly in the output image, i.e. the dynamic range transform may simply be a unity mapping. Furthermore, if the output white point luminance does not correspond directly to a white point luminance of a received image but does match an end-user display white point luminance for which explicit dynamic range transform control data has been provided, this control data may be used directly to adapt the dynamic range transform. If the output white point luminance does not correspond directly with the white point luminance of a received image or with a white point luminance for which dynamic range transform control data has been provided, the tone mapping parameters provided by the control data for different white point luminances may be used to adapt the dynamic range transform in dependence on the output white point luminance. In particular, the dynamic range processor 203 may interpolate between the tone mapping parameters for other white point luminance values to the specific output white point luminance. In many embodiments, a simple linear interpolation will be sufficient but it will be appreciated that many other approaches may be used.

Indeed, the control data may for example also provide information on how the provided tone mapping parameters for different display white point luminances should be processed to generate tone mapping parameters for the specific output white point luminance. For example, the control data may indicate a non-linear interpolation function which must be used to generate appropriate tone mapping parameters.

It will also be appreciated that the dynamic range transform is not necessarily constant for different images or even for the same image.

Indeed, in many systems the dynamic range transform control data may continuously be updated thereby allowing the dynamic range transform performed by the dynamic range processor 203 to be adapted to the current characteristics. This may allow different tone mappings to be used for dark images/scenes than for bright images/scenes. This can provide improved performance. Indeed, a time variable dynamic range transform controlled in response to dynamically updated dynamic range transform control data can be used to provide additional control to the content provider. For example, the rendering of a dark scene may be different on an HDR display depending on whether the scene is a tense scene intended to provide unease or whether the scene is merely dark in order to correspond to a nighttime scenario (in the first case the dark scene may be rendered as dark on the HDR display as on an LDR display, and in the second case the dark scene may be rendered somewhat lighter thereby exploiting the additional dynamic range to allow improved visually perceptible differentiation in dark areas).

The same considerations may be applied within an image. For example, a scene may correspond to a bright sky over a dark shadowy ground (e.g. a bright sky in the upper half of the image and a forest in the lower half of the image). The two areas may advantageously be mapped differently when mapping from LDR to HDR, and the dynamic range transform control data may specify the difference in these mappings. Thus, the dynamic range transform control data may include tone mapping parameters that change for different images and/or which depend on the position in the image.

As a specific example, at least some control data may be associated with a given image area, luminance range, and/or image range.

The dynamic range transform control data may be provided to the image processing device 103 in accordance with any suitable communication approach or standard.

In the specific example of the communication between the content provider apparatus 101 and the image processing device 103 uses a Blu-ray™ medium. Transmission of control commands for the dynamic range transform may be achieved by embedding these parameters values in the BDROM data on the disc. An extension data structure in the playlist file (xxxxx.mpls) can be used for this. This extension data structure will have a unique and new identification. Legacy BDROM players will be ignorant of this new data structure and will simply ignore it. This will guarantee backward compatibility. A possible implementation of the syntax and semantics of such an LHDR_descriptor is shown below.

| Syntax | No. of bits | Mnemonics |
|---|---|---|
| LHDR_Descriptor ( ) { | | |
| Video_Process_descriptor | 8 | uimsbf |
| DR_Process_descriptor | 8 | uimsbf |
| Level_Process_descriptor | 8 | uimsbf |
| Dynamic_range | | |
| } | | |

In this example the LHDR_descriptor contains three processing descriptors. These parameters specify the additional processing of the video in case the target display category is different from the end-user display category. As an example these parameters can have the following values.

Video_Process_descriptor:

| Value | Video/Graphics processing in case of Target Display = LDR End-user's Display = HDR | Video/Graphics processing in case of Target Display = HDR End-user's Display = LDR |
|---|---|---|
| 0x00 | No additional processing | No additional processing |
| 0x01 | Allow limited additional processing depending on DR_Process_descriptor and Level_Process_descriptor. | Allow limited additional processing depending on DR_Process_descriptor and Level_Process_descriptor. |
| 0x02 | No restrictions on additional processing | No restrictions on additional processing |
| 0x03-0xFF | reserved | reserved |

DR_Process_descriptor:

| Value | Video/Graphics processing in case of Target Display = LDR End-user's Display = HDR | Video/Graphics processing in case of Target Display =HDR End-user's Display = LDR |
|---|---|---|
| 0x00 | Allow increase of dynamic range to 125% | Allow decrease of dynamic range to 80% |
| 0x01 | Allow increase of dynamic range to 150% | Allow decrease of dynamic range to 70% |
| 0x02 | Allow increase of dynamic range to 200% | Allow decrease of dynamic range to 50% |
| 0x03-0xFF | reserved | reserved |

Level_Process_descriptor:

| Value | Video/Graphics processing in case of Target Display = LDR End-user's Display = HDR | Video/Graphics processing in case of Target Display = HDR End-user's Display = LDR |
|---|---|---|
| 0x00 | Allow adaptation of level range to 80-125% | Allow adaptation of level range to 80-125% |
| 0x01 | Allow increase of level range to 70-150% | Allow increase of level range to 70-150% |
| 0x02 | Allow increase of level range to 50-200% | Allow increase of level range to 50-200% |
| 0x03-0xFF | reserved | reserved |

The previous examples focused on examples wherein the signal received from the content provider apparatus 101 comprises only one version of the image/video sequence, and specifically where the signal comprises only an LDR image/video sequence.

However, in some systems and implementations, the content provider apparatus 101 may generate an image signal which comprises more than one version of the image(s). In such scenarios one image may be tone mapped for one target display and another image may correspond to the same original image but tone mapped for a different target display. Specifically, one image may be an LDR image generated for e.g. a 500 nits display and another image may be an HDR image generated for e.g. a 2000 nits display.

In such an example, the image signal may further comprise a second target display reference, i.e. a target display reference may be provided for each of the images thereby indicating the display characteristics for which the tone mapping at the encoder side has been optimized for the individual images. Specifically, a maximum brightness and gamma parameter may be provided for each image/video sequence.

In such systems, the image processing device 103 can be arranged to apply the dynamic range transform in response to the second target display reference, and specifically by considering both the first and second target display references.

The dynamic range transform may not only adapt the specific mapping or operation that is performed on an image but may also depending on the target display references select which image to use as the basis for the transformation. As a low complexity example, the dynamic range processor 203 may select between using the first and second images depending on how closely the associated target display reference matches the white point luminance for which the output signal is generated. Specifically, the image associated with a white point luminance closest to the desired output white point luminance can be selected. Thus, if an LDR output image is generated, the dynamic range transform may be performed from the encoded LDR image. However, if an HDR image with higher maximum brightness than the encoded HDR image is generated, the dynamic range transform may be performed on the encoded HDR image.

If an image is to be generated for a maximum brightness between the white point luminances of the encoded images (e.g. for a 1000 nits display), the dynamic range transform may be based on both images. In particular, an interpolation between the images may be performed. Such an interpolation may be linear or non-linear and may be performed directly on the encoded images prior to transformation or may be applied on images after application of the transformation. The weighting of the individual images can typically depend on how closely they are to the desired output maximum brightness.

For example, a first transformed image may be generated by applying a dynamic range transform to the first encoded image (the LDR image) and a second transformed image may be generated by applying a dynamic range transform to the second transformed image. The first and second transformed images are then combined (e.g. summed) to generate the output image. The weights of respectively the first and the second transformed images are determined by how closely the target display references of respectively the first and second encoded images match the desired output maximum brightness.

For example, for a 700 nits display, the first transformed image may be weighted much higher than the second transformed image and for a 3000 nits display the second transformed image may be weighted significantly higher than the first transformed image. For a 2000 nits display the two transformed images may possibly be weighted equally and the output values may be generated by an averaging of the values for each image.

As another example, the transformation may be performed selectively based on the first or second image for different image areas, e.g. depending on image characteristics.

For example, for relatively dark areas the dynamic range transform may be applied to the LDR image to generate pixel values that are suitable for a 1000 nits display yet utilize the finer resolution that may be available for dark areas for the LDR image corresponding to the HDR image (e.g. if the same number of bits are used for both images). However, for brighter areas the pixel values may be generated by applying a dynamic range transform to the HDR image thereby exploiting that this image will typically have more information in the high brightness ranges (specifically the information loss due to clipping is typically much less for an HDR image relative to an LDR image).

Thus, when more than one image are received from the content provider apparatus 101 the image processing device 103 may generate the output image from one of these images or may combine them when generating an output image. The selection and/or combination of the encoded images is based on the target display reference provided for each image as well as on the maximum brightness for which the output signal is generated.

It will be appreciated that in addition to the combination and/or selection of the individual encoded images, the individual dynamic range transforms may also be adjusted and adapted in response to the dynamic range transform. For example, the previously described approaches may be applied individually to each dynamic range transform. Similarly, dynamic range transform control data may be received which can be used to adapt and control each dynamic range transform as previously described. In addition, the dynamic range transform control data may contain information that defines mandatory, optional or preferred/suggested parameters for the combination of the processing of the first and second encoded images.

In some systems, dynamic range transform control data comprises different transform control data for different image categories. Specifically, different types of images/content may be processed differently when performing the dynamic range transform.

For example, different tone mappings may be defined or suggested for different types of video content. For example, a different dynamic range transform is defined for a cartoon, a horror film, a football game etc. The received video signal may in such a case provide metadata describing the content type (or content analysis may be applied locally in the image processing device 103) and apply the appropriate dynamic range transform for the specific content.

As another example, a rendered image may be generated as a combination of overlaid images with different transforms being provided for the different images. For example, in Blu-ray™ a number of different presentation planes are defined (as illustrated in FIG. 5) and different dynamic range transforms may be applied for the different presentation planes.

The characteristics of each of these presentation planes are optimized by the content provider for a specific target display. The viewing experience for the end-user can be optimized by adapting the characteristics of the presentation planes to the end-user display. Typically the optimal adaptation will be different for the different presentation planes.

With respect to tone mapping the situation in the present day BDROM system is as follows:
  Video tone mapping (global and/or local) is performed in the studio using a studio monitor.
  Graphics tone mapping (generally different from Video tone mapping) is performed in the studio using a studio monitor.
  OSD tone mapping is performed in the BDROM player.
  Global and/or local tone mapping is performed in the display on the combined Video & Graphics signal. This processing cannot be controlled by the end-user.
  Global tone mapping is performed in the display on the combined Video & Graphics signal. This processing depends on, among other things, the brightness and contrast values set by the end-user.
  Improved picture quality is achieved when:
  1. Video tone mapping is optimized for the end-user display.
  2. Graphics tone mapping is optimized for the end-user display.
  3. The system allows for Graphics tone mapping different from Video tone mapping.
  4. The System allows for different Graphics tone mapping for different Graphics components 5. The system allows for Video & Graphics tone mapping depending on Video characteristics.

Also note that in case that both an LDR and an HDR version of the Video are present on the disc, the additional tone mapping will depend on two sets of parameters for the target displays: one for the LDR version of the video and one for the HDR version of the video.

In another enhanced implementation, the Video and/or Graphics tone mapping varies in time and depend for example on the Video content in a scene. The content provider may send tone mapping instructions to the player depending on the characteristics of the Video and Graphics content. In another implementation, the player autonomously extracts the characteristics of the Video from the Video signal and adapts the Video & Graphics tone mapping depending on these characteristics.

E.g. subtitles may be dimmed for a certain time span, or a certain gamma change may be implemented for an amount of time (and both may be coordinated).

In the following an example of how to provide control commands for Graphics tone mapping for a BDROM is described.

Figure 14:
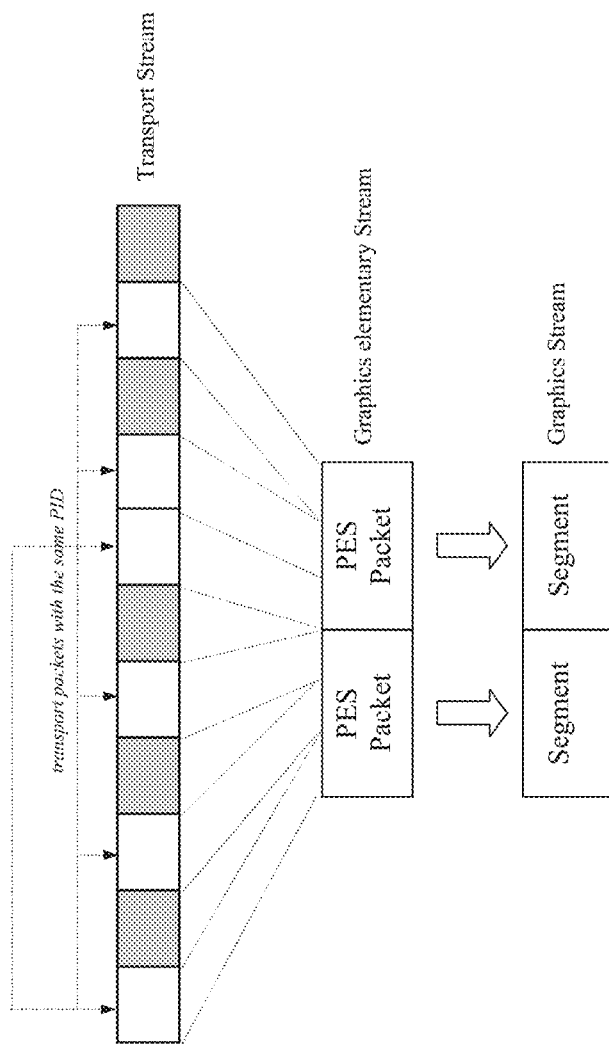
FIG. 14 illustrates the structure of a graphics stream in accordance with the Blu-ray™ standard.

A BDROM graphics stream consists of segments embedded in PES packets that are embedded in a transport stream. FIG. 14 illustrates the appropriate data structure.

Synchronization with the main video is done at elementary stream level using PTS values in the PES packets. The BDROM graphics segment consists of a segment descriptor and the segment data. The segment descriptor contains the type of the segment and the length.

The following table shows some types of segments defined in the Blu-ray Disc standard:

| Value | Segment |
|---|---|
| 0x00-0x13 | reserved |
| 0x14 | Palette Definition Segment |
| 0x15 | Object Definition Segment |
| 0x16 | Presentation Composition Segment |
| 0x17 | Window Definition Segment |
| 0x18 | Interactive Composition Segment |
| 0x19-0x7F | reserved |
| 0x80 | End of Display Set Segment |
| 0x81-0x82 | Used by HDMV Text subtitle streams |
| 0x83 | LHDR_Processing_Definition_Segment |
| 0x84-0xFF | reserved |

In the existing specification, values 0x83 to 0xFF are reserved. Therefore a new segment type is defined using for example value 0x83 to indicate a segment that contains the LHDR_Processing_definition segment. In general, the LHDR_Processing_definition segment defines the way the graphics decoder processes the graphics in case of the target display being different from the end-user display.

The following table shows an example of a possible structure of the LHDR_Processing_definition segment:

| Syntax | No. of bits | Mnemonics |
|---|---|---|
| LHDR_Processing_definition segment ( ) { | | |
| segment_descriptor( ) | 8 | uimsbf |
| Pup-up_process_descriptor | 8 | uimsbf |
| Subtitle_process_descriptor | 8 | uimsbf |
| Number_of_HDR_Palettes | 8 | uimsbf |
| for (i=0; i<Number_of_HDR_Palettes; i++) { | | |
| palette_id | 8 | uimsbf |
| palette_version_number | 8 | uimsbf |
| Number_of_entries | 8 | uimsbf |
| for (i=0; i< Number_of_entries; i++) { | | |
| palette_entry( ){ | | |
| Palette_entry_id | 8 | uimsbf |
| Y_value | 12 | uimsbf |
| Cr_value | 12 | uimsbf |
| Cb-value | 12 | uimsbf |
| T_value | 12 | uimsbf |
| } | | |
| } | | |
| } | | |

In this example, the LHDR_Processing_definition segment contains two processing descriptors: Pop-up_process_descriptor and Subtitle_process_descriptor. The segment may also contain palettes to be used in case the target display category is different from the end-user display category. The LHDR palette contains the same number of entries as the original palette but the entries are optimized for the other display category.

The parameter Pop-up_process_descriptor specifies the additional processing of the Pop-up graphics in case target display category is different from the end-user display category.

As an example this parameter can have the following values.

Pop-up_process_descriptor=0x00: No additional processing.

Pop-up_process_descriptor=0x01 to 0x03: set minimum transparency value.

Pop-up_process_descriptor=0x04: the graphics processor uses palettes defined in the LHDR_Processing_definition segment.

Pop-up_process_descriptor=0x05: No restrictions on additional processing.

The parameter Subtitle_process_descriptor specifies the additional processing of Subtitle graphics in case the target display category is different from the end-user display category.

As an example this parameter can have the following values.

Subtitle_process_descriptor=0x00: No additional processing.

Pop-up_process_descriptor=0x01 to 0x03: Adapt luma value.

Subtitle_process_descriptor=0x04: the graphics processor uses palettes defined in the LHDR_Processing_definition segment.

Subtitle_process_descriptor=0x05: No restrictions on additional processing.

Specific examples of syntaxes for the Pop-up_process_descriptor and the Subtitle_process_descriptor are provided in the following tables:

| Value | Graphics processing in case of Target Display = LDR End-user's Display = HDR | Graphics processing in case of Target Display = HDR End-user's Display = LDR |
|---|---|---|
| 0x00 | No additional processing | No additional processing |
| 0x01 | Set T_value >= 128 | No additional processing |
| 0x02 | Set T_value >= 192 | No additional processing |
| 0x03 | Set T_value >= 222 | No additional processing |
| 0x04 | Use LHDR palettes | Use LHDR palettes |
| 0x05 | No restrictions | No restrictions |
| 0x06-0xFF | reserved | reserved |

| Value | Graphics processing in case of Target Display = LDR End-user's Display = HDR | Graphics processing in case of Target Display = HDR End-user's Display = LDR |
|---|---|---|
| 0x00 | No special processing | No special processing |
| 0x01 | Luma:=Luma/5 | Luma:=Luma*5 |
| 0x02 | Luma:=Luma/3 | Luma:=Luma*3 |
| 0x03 | Luma:=Luma/2 | Luma:=Luma*2 |
| 0x04 | Use LHDR palettes | Use LHDR palettes |
| 0x05 | No restrictions | No restrictions |
| 0x06-0xFF | reserved | reserved |

Figure 15:
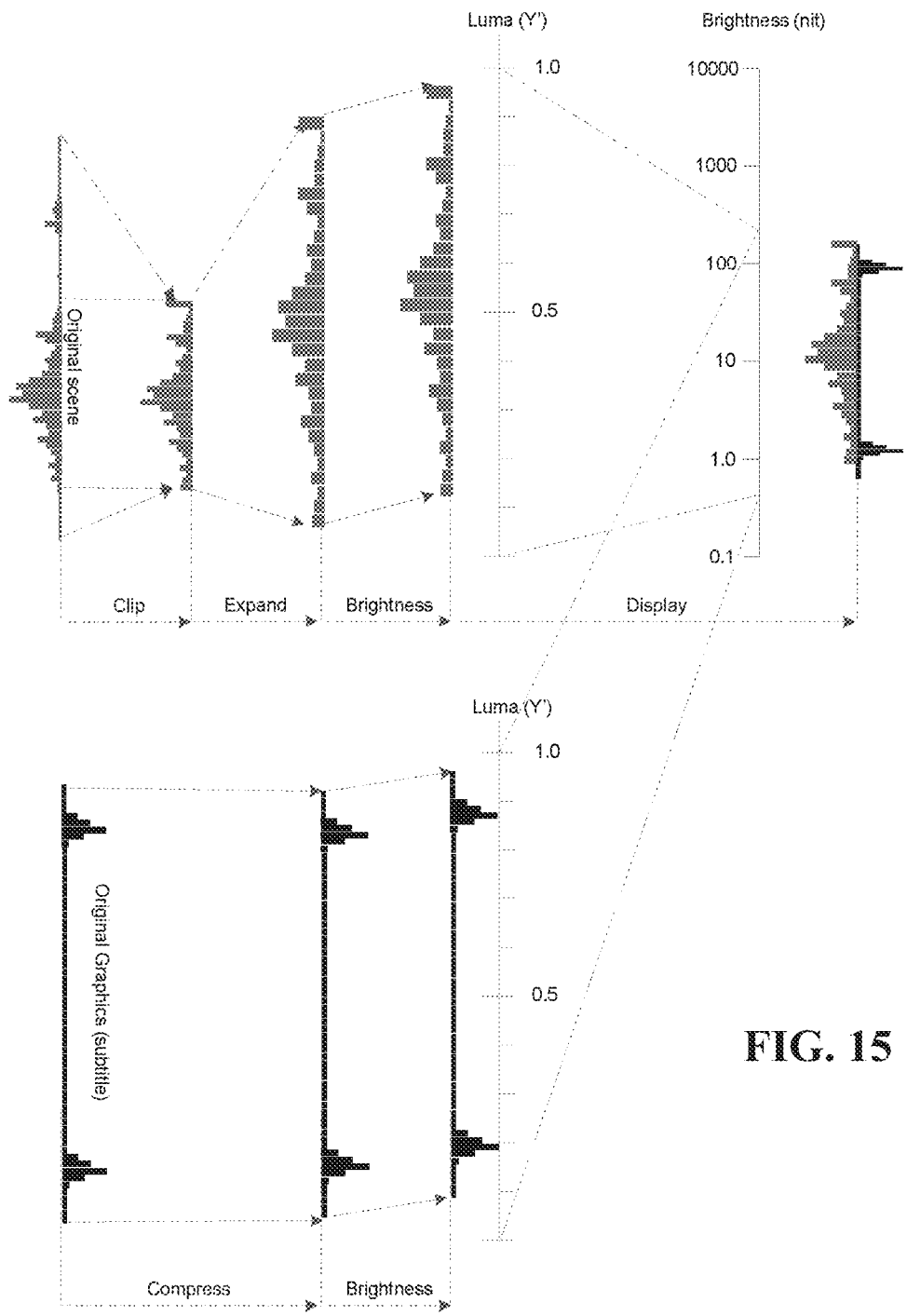
FIG. 15 illustrates an example of the dynamic range processing for an image and an associated overlay graphics image.
Figure 16:
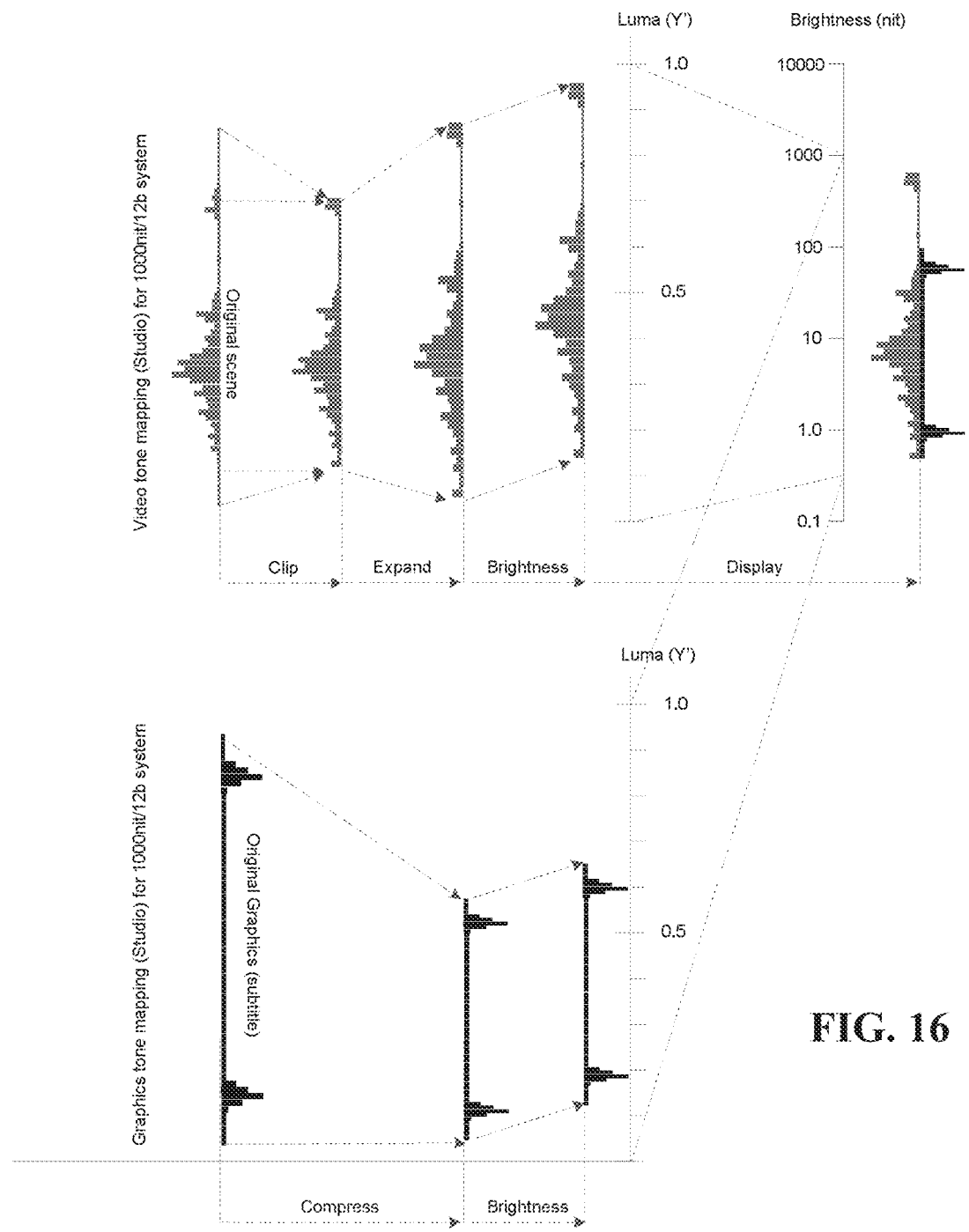
FIG. 16 illustrates an example of the dynamic range processing for an image and graphics.

Specific examples of differentiated tone mapping depending on display characteristics are illustrated in FIGS. 15 and 16. In these examples, the original content features HDR video content and subtitles. Tone mapping for the video is the same as in the example of FIG. 6.

The Graphics features white sub-title characters with a black border. The original histogram shows a peak in the low-luma range and another peak in the high luma range. This histogram for the subtitle content is very suitable for a LDR display as it will result in bright legible text on the display. However, on a HDR display these characters would be too bright causing annoyance, halo and glare. For that reason, the tone mapping for the sub-title graphics will be adapted as depicted in FIG. 16.

In the previous examples, the image processing device 103 has generated an output image to correspond to a desired maximum brightness, i.e. intended for presentation on a display with a given dynamic range/white point luminance. The output signal may specifically be generated to correspond to a user setting which indicates a desired maximum/white point luminance, or may simply assume a given dynamic range for the display 107.

In some systems the image processing device 103 may comprise a dynamic range processor 203 which is arranged to adapt its processing in dependence on data received from the display 107 indicating a luminance characteristic of the display 107.

Figure 17:
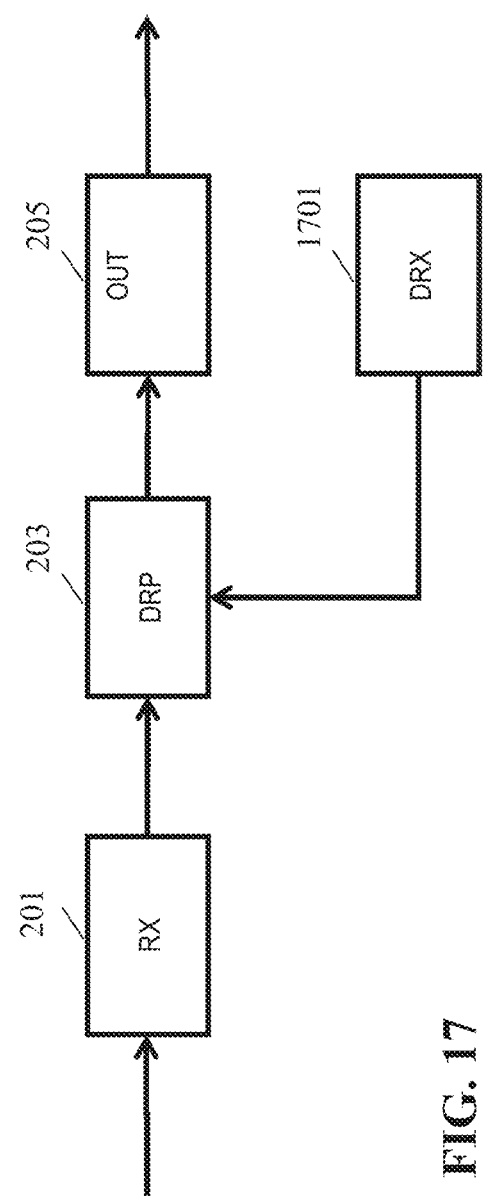
FIG. 17 is an illustration of an example of elements of an image processing apparatus.

An example of such an image processing device 103 is illustrated in FIG. 17. The image processing device 103 corresponds to that of FIG. 1 but in this example the image processing device 103 also comprises a display receiver 1701 which receives a data signal from the display 107. The data signal comprises a data field which comprises a display dynamic range indication for the display 107. The display dynamic range indication comprises at least one luminance specification indicative of a luminance property of the display. Specifically the luminance specification may include a specification of a maximum brightness, i.e. of a maximum/white point luminance for the display. Specifically, the display dynamic range indication can define whether the display is an HDR or LDR display and may in particular indicate the maximum light output in nits. Thus, the display dynamic range indication can define if the display is a 500 nits, 1000 nits, 2000 nits, 4000 nits etc display.

The display receiver 1701 of the image processing device 103 is coupled to the dynamic range processor 203 which is fed the display dynamic range indication. The dynamic range processor 203 can accordingly generate an output signal which directly corresponds to the specific display rather than to generate the output signal for an assumed or manually set white point luminance.

The dynamic range processor 203 may accordingly adapt the dynamic range transform in response to the received display dynamic range indication. For example, the received encoded image may be an LDR image and it may be assumed that this image has been optimized for a 500 nits display. If the display dynamic range indication indicates that the display is indeed a 500 nits display, the image processing device 103 may use the encoded image directly. However, if the display dynamic range indication indicates that the display is a 1000 nits display, a first dynamic transform may be applied. If the display dynamic range indication indicates that the display 107 is a 2000 nits display, a different transform may be applied, etc. Similarly, if the received image is a 2000 nits optimized image, the image processing device 103 may use this image directly if the display dynamic range indication indicates that the display is a 2000 nits display. However, if the display dynamic range indication indicates that the display is a 1000 nits or a 500 nits display, the image processing device 103 may perform the appropriate dynamic range transform to reduce the dynamic range.

Figure 18:
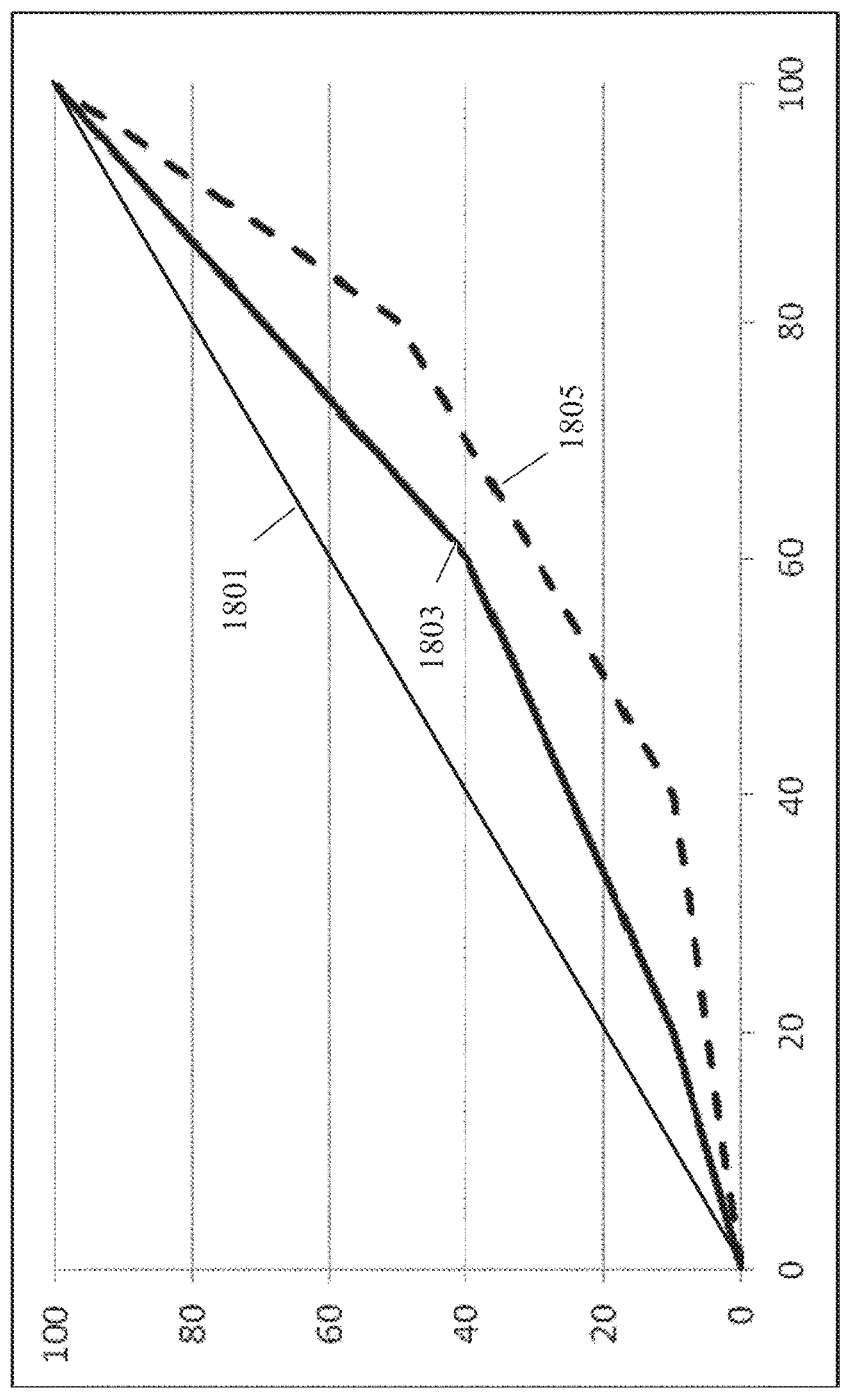
FIG. 18 illustrates an example of a mapping for an image processing apparatus.

For example, referring to FIG. 18, two different transformations may be defined for respectively a 1000 nits display and for a 4000 nits display, and with a third one-to-one mapping being defined for a 500 nits display. In FIG. 1, the mapping for the 500 nits display is indicated by curve 1801, the mapping for the 1000 nits display is indicated by curve 1803, the mapping for the 4000 nits display is indicated by curve 1805. Thus, in the example, the received encoded image is assumed to be a 500 nits image and this is automatically converted into an image suitable for the specific display. Thus, the image processing device 103 can automatically adapt and generate an optimized image for the specific display to which it is connected. In particular, the image processing device 103 can automatically adapt to whether the display is an HDR or LDR display, and can further adapt to the specific white luminance of the display.

It will be appreciated that the inverse mappings may be used when mapping from a higher dynamic range to a lower dynamic range.

If the display has a white luminance corresponding to one of the three curves of FIG. 18, the corresponding mapping may be applied to the encoded image. If the display has a different luminance value, a combination of the transformations may be used.

Thus, the dynamic range processor 203 may select an appropriate dynamic range transform depending on the display dynamic range indication. As a low complexity example, the dynamic range processor 203 may select between using the curves depending on how closely the associated white point luminance matches the white point luminance indicated by the display dynamic range indication. Specifically, the mapping that is associated with a white point luminance closest to the desired white point luminance indicated in the display dynamic range indication can be selected. Thus, if an LDR output image is generated, the dynamic range transform may be performed using curve 1801. If a relatively low white point luminance HDR image is generated, the mapping of curve 1803 is used. However, if high white point luminance HDR image is generated, curve 1805 is used.

If an image is to be generated for a white luminance in-between the dynamic range transforms for the two HDR settings (e.g. for a 2000 nits display), both mappings 1803, 1805 may be used. In particular, an interpolation between the transformed images for the two mappings may be performed. Such an interpolation may be linear or non-linear. The weighting of the individual transformed images can typically depend on how closely they are to the desired output maximum brightness.

For example, a first transformed image may be performed by applying a first mapping 1803 to the encoded image (the LDR image) and a second transformed image may be performed by applying a second mapping to the encoded image. The first and second transformed images are then combined (e.g. summed) to generate the output image. The weights of respectively the first and the second transformed images are determined by how closely the white luminance associated with the different mappings match the display white luminance indicated in the display dynamic range indication.

For example, for a 1500 nits display, the first transformed image may be weighted much higher than the second transformed image and for a 3500 nits display the second transformed image may be weighted significantly higher than the first transformed image.

In some embodiments, the dynamic range processor (203) may be arranged to select between generating the output image as the received encoded image and generating the output image as a transformed image of the received encoded image in response to the display dynamic range indication.

Specifically, if the white point luminance indicated by the display dynamic range indication is sufficiently close to the white point luminance indicated or assumed for the received image, the dynamic range transform may simply consist in not performing any processing on the received image, i.e. the input image may simply be used as the output image. However, if the white point luminance indicated by the display dynamic range indication is different to the white point luminance assumed or indicated for the received image, the dynamic range transform may modify the received encoded image in accordance with a suitable mapping of the input image pixels to output image pixels. In such cases, the mapping may be adapted depending on the received indication of the white point luminance of the end user display. In other examples, one or more predetermined mappings may be used.

For example, the image processing device 103 may include a predetermined first mapping which has been determined to provide a suitable output image for a doubling in the white point level and a predetermined second mapping which has been determined to provide a suitable output image for a halving in the white point level. In such an example, the image processing device 103 may select between the first mapping, the second mapping, and a unity mapping dependent on the white point luminance of the received image (e.g. as indicated by the target display reference) and the white point luminance for the end user display as indicated by the display dynamic range indication. The image processing device 103 may specifically select the mapping which most closely corresponds to the ratio between the white point luminances of the input image and the end-user display.

For example, if an input image is received with a target display reference indicating that it has been optimized for a 1000 nits display and the end-user display is a 2000 nits display, the image processing device 103 will select the first mapping. If instead, the display dynamic range indication indicates that the end-user display is a 1000 nits display, the image processing device 103 will select the unity mapping (i.e. use the input image directly). If the dynamic range indication indicates that the end-user display is a 500 nits display, the image processing device 103 will select the second mapping.

If in-between values for the white point luminance of the end-user display are received, the image processing device 103 may select the mapping closest to the ratio between the white point luminances, or may e.g. interpolate between the mappings.

Figure 19:
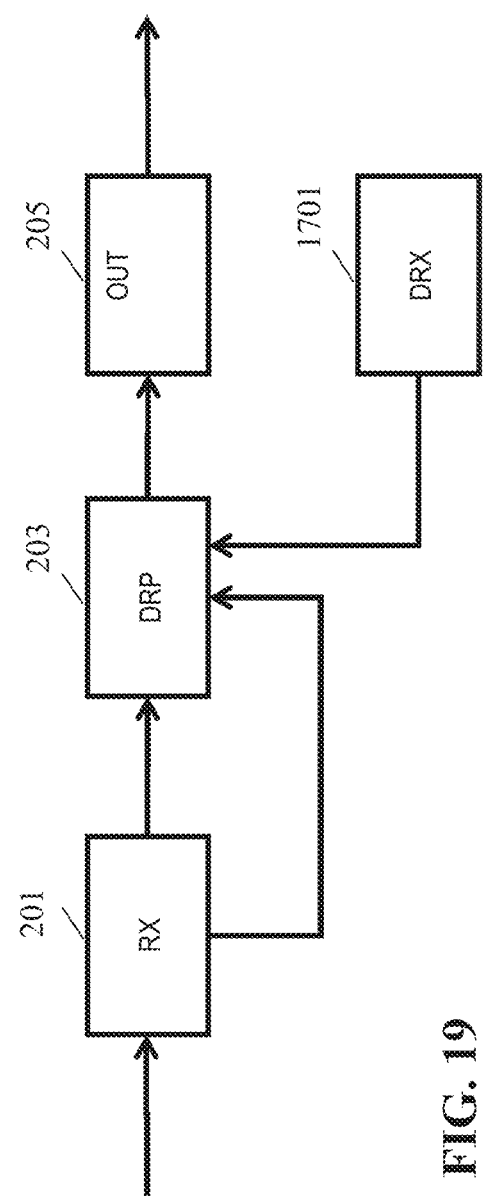
FIG. 19 is an illustration of an example of elements of an image processing apparatus.

In the example of FIG. 2, the image processing device 103 is arranged to perform a dynamic range transform based on a target display reference received from the content provider apparatus 101 but without any specific information or knowledge of the specific display 107 (i.e. it may simply generate the output image to be optimized for a given dynamic range/white point but without explicitly knowing if the connected display 107 has that value). Thus, an assumed or reference white point luminance may be used. In the example of FIG. 17, the image processing device 103 may perform a dynamic range transform based on a display dynamic range indication received from the display 107 but without any specific information or knowledge of the specific dynamic range and white point luminance that the received encoded image has been generated for (i.e. it may simply generate the output image based on given dynamic range/white point luminance for the received encoded image but without explicitly knowing if the image has actually been generated for such a range and luminance). Thus, an assumed or reference white point luminance for the encoded image may be used. However, it will be appreciated that in many implementations the image processing device 103 may be arranged to perform the dynamic range transform in response to both information received from the content provider side and from the end-user display. FIG. 19 shows an example of an image processing device 103 which comprises a dynamic range processor 203 arranged to perform a dynamic range transform in response to both the target display reference and the display dynamic range indication. It will also be appreciated that the comments and descriptions provided for the independent approaches of FIGS. 2 and 17 apply equally (mutatis mutandis) to the system of FIG. 19.

The approaches may be particularly advantageous in inhomogeneous content distribution systems such as e.g. what is increasingly perceived for future television systems. Indeed the (peak) brightness of displays is currently rapidly increasing and in the near future, displays with a wide variety of (peak) brightness are expected to coexist in the market. Since the display brightness (and typically the electro-optical transfer function that specifies how a display converts input pixel (color) driving values into light values which then provides a particular psychovisual impression to the viewer) is no longer known at the content generation side (and which is furthermore generally different from the reference monitor for which the content was intended/graded), it becomes challenging to provide the best/optimal picture quality on the display.

Therefore, in the system of FIG. 1 the display 107 (or sink device) can send information about its brightness capabilities (peak brightness, grey(color) rendering transfer function, or other grey rendering properties over its HDR range, like a particular electro-optical transfer function etc.) back to the image processing device 103.

In the specific example the image processing device 103 is a BDROM player connected to a display by means of a HDMI interface, and thus the display dynamic range indication may be communicated from the display to the image processing device 103 via an HDMI interface. Thus, the display dynamic range indication can specifically be communicated as part of the EDID information which can be signaled over HDMI from the display 107 to the image processing device 103. However, it will be appreciated that the approach can be applied to many other video/graphics generating devices like DVB receivers, ATSC receivers, Personal computers, tablets, smart phones and game consoles etc. It will also be appreciated that many other wired and wireless interfaces can be used such as Display Port, USB, Ethernet and WIFI etc.

The image processing device 103 can then select e.g. one of different versions of the content/signal depending on e.g. the display brightness. For example, if the signal from the content provider apparatus 101 comprises both an LDR and HDR image, the image processing device 103 can select between these based on whether the display dynamic range indication is indicative of the display being an LDR display or an HDR display. As another example, the image processing device 103 can interpolate/mix different brightness versions of the content to derive a new signal that is approximately optimal for the display brightness. As another example, it can adapt the mapping from the encoded image to the output image.

It will be appreciated that in different implementations different parameters and information may be provided in the display dynamic range indication. In particular, it is noted that the previously provided comments and descriptions for the target display reference may apply equally to the display dynamic range indication. Thus, the parameters and information communicated from the display 107 to the image processing device 103 may be as those described for communication of information on the target display from the content provider apparatus 101 to the image processing device 103.

Specifically, the display can communicate a maximum luminance/white point luminance for the display and this may be used by the dynamic range processor 203 to adapt the output signal as previously described.

In some embodiments, the display dynamic range indication may alternatively or additionally include a black point luminance for the display 107. The black point luminance may typically indicate a luminance corresponding to drive values corresponding to the darkest pixel value. The intrinsic black point luminance for a display may for some displays correspond to practically no light output. However, for many displays the darkest setting of e.g. the LCD elements still result in some light output from the display resulting in black image areas being perceived lighter and greyish rather than deep black. For such displays, the information of the black point luminance can be used by the dynamic range processor 203 to perform a tone mapping where e.g. all black levels below the black point luminance of the display will be converted to the deepest dark pixel value (or e.g. using a more gradual transition). In some scenarios the black point luminance may include a contribution from ambient light. For example, the black point luminance may reflect the amount of light being reflected from the display.

In addition, the display dynamic range indication may for many displays include more information characterizing the OETF of the display. Specifically, as previously mentioned, the display can include the white point luminance and/or the black point luminance. In many systems, the display dynamic range indication may also include more details about the OETF of the display at intervening light outputs. Specifically, the display dynamic range indication can include a gamma of the OETF for the display.

The dynamic range processor 203 can then use information of the this OETF to adapt the specific dynamic range transform to provide the desired performance and in particular, the conversion to an HDR image may reflect not only that a brighter light output is possible but may also take into consideration exactly how the relationship between the drive values should be generated to provide the desired light output in the increased brightness range. Similarly, the conversion to an LDR image may reflect not only that a less bright light output is available but may also take into consideration exactly how the relationship between the drive values should be generated to provide the desired light output in the reduced brightness range.

The display dynamic range indication may thus specifically provide information that informs the dynamic range processor 203 of how it should map input values corresponding to one dynamic range to output values corresponding to another and typically larger dynamic range. The dynamic range processor 203 can take this into consideration and can for example compensate for any variations or non-linearities in the rendering by the display 107.

It will be appreciated that many different dynamic range transforms are possible and that many different ways of adapting such dynamic range transforms based on the display dynamic range indication may be used. Indeed, it will be appreciated that most of the comments provided for the dynamic range transform based on the target display reference from the content provider apparatus 101 are equally appropriate (mutatis mutandis) to the dynamic range transform based on information of the luminance characteristics of the end-user display.

Figure 20:
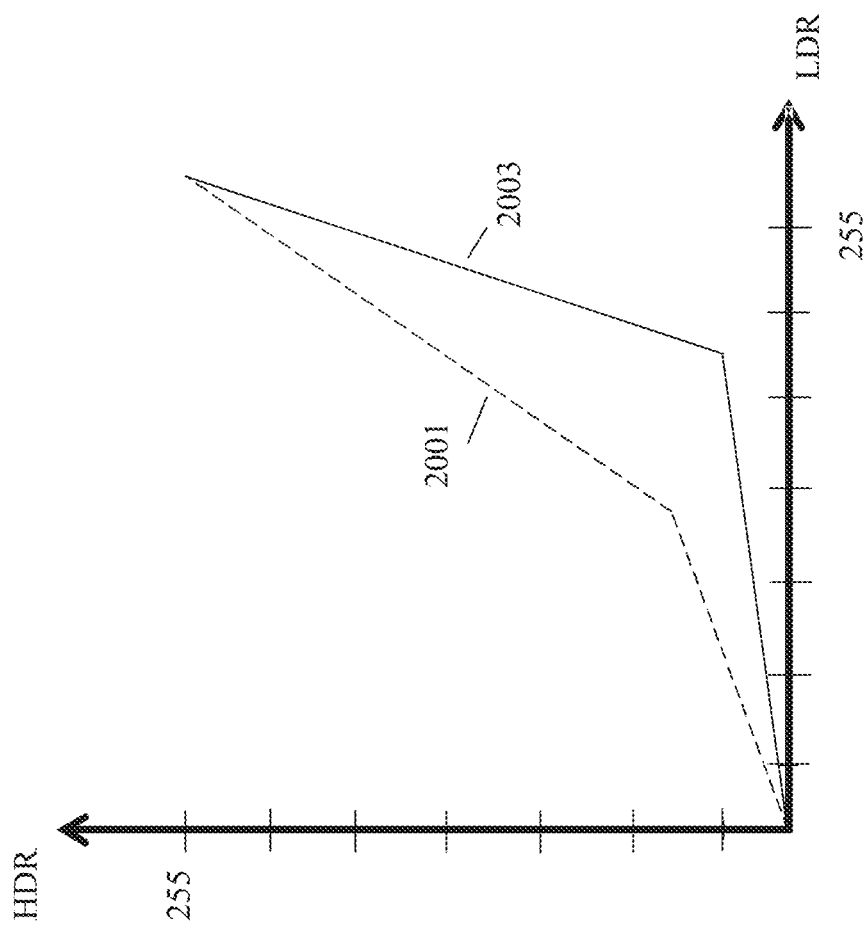
FIG. 20 illustrates an example of a mapping for an image processing apparatus.

As a low complexity example, the dynamic range transform may simply apply a piecewise linear function to the input values of an LDR image to generate improved HDR values (or to the input values of an HDR image to generate improved LDR values). Indeed, in many scenarios, a simple mapping consisting of two linear relationships as illustrated in FIG. 20 can be used. The mapping shows a direct mapping between input pixel values and output pixel values (or in some scenarios the mapping may reflect a (possibly continuous) mapping between input pixel luminances and output pixel luminances).

Specifically, the approach provides a dynamic range transform which maintains the dark areas of an image to remain dark while at the same time allows the substantially increased dynamic range to be used to provide a much brighter rendering of bright areas, as well as indeed an improved and more lively looking midrange. However, the exact transformation depends on the display on which it is to be rendered. For example, when rendering an image for a 500 nits display on a 1000 nits display, a relatively modest transformation is required and the stretching of the bright areas is relatively limited. However, if the same image is to be displayed on a 5000 nits display, a much more extreme transformation is required in order to fully exploit the available brightness without brightening the dark areas too much. FIG. 20 illustrates how two different mappings may be used for respectively a 1000 nits display (curve 2001, maximum value of 255 corresponding to 1000 nits) and a 5000 nits display (curve 2003 maximum value of 255 corresponding to 5000 nits) for a 500 nits LDR input image (maximum value of 255 corresponding to 500 nits). The image processing device 103 may further determine suitable values for other maximum luminances by interpolating between the provided values. In some implementations, more points may be used to define a curve which is still piecewise linear but with more linear intervals.

It will be appreciated that the same mappings can be used when mapping from an HDR input image to an LDR output image.

In some embodiments, the dynamic range transform may comprise or consist in a gamut transform which may be dependent on the received display dynamic range indication. Thus, in some embodiments, the dynamic range processor 203 may modify chromaticities of the rendered image depending on the display dynamic range indication. For example, when a received HDR image is rendered on an LDR display the compression may result in a blander image with fewer variations and gradations in individual image objects. The dynamic range transform may compensate for such reductions by increasing chroma variations. For example, when an image with a brightly lit apple is optimized for rendering on an HDR display, the rendering on an LDR display with reduced dynamic range will typically make the apple appear to stand out less and appear less clear and more dull. This may by the dynamic range transform be compensated by making the color of the apple more saturated. As another example, the texture variations may become less perceptually significant due to the reduced luminance variations and this may be compensated by increasing the chroma variations of the texture.

The display dynamic range indication may in some examples or scenarios provide generic information for the display, such as the standard manufacturing parameters, the default EOTF etc. In some examples and scenarios, the display dynamic range indication may further reflect the specific processing performed in the display and may specifically reflect user settings. Thus, in such examples, the display dynamic range indication does not merely provide fixed and unchanging information that depends only on the display but rather provides a time varying function that may reflect the specific operation of the display.

For example, the display may be able to operate in different image modes with different rendering characteristics. For example, in a "vivid" display mode, the display may render images with the bright areas brighter than normal, in a "mute" display mode the display may render the images with the bright areas darker than normal etc. The information on the current mode, e.g. the specific gamma for this mode, can be reported to the image processing device 103 as part of the display dynamic range indication thereby allowing the image processing device 103 to adapt the dynamic range transform to reflect the rendering characteristics. The image processing device 103 may for example override the display setting by compensating for this or may optimize the transform to maintain the specific setting.

The display dynamic range indication may also reflect other processing settings for the display. For example, clipping levels, backlight power settings, color scheme mappings etc may be communicated to the image processing device 103 where they can be used by the dynamic range processor 203 to adapt the dynamic range transform.

Figure 21:
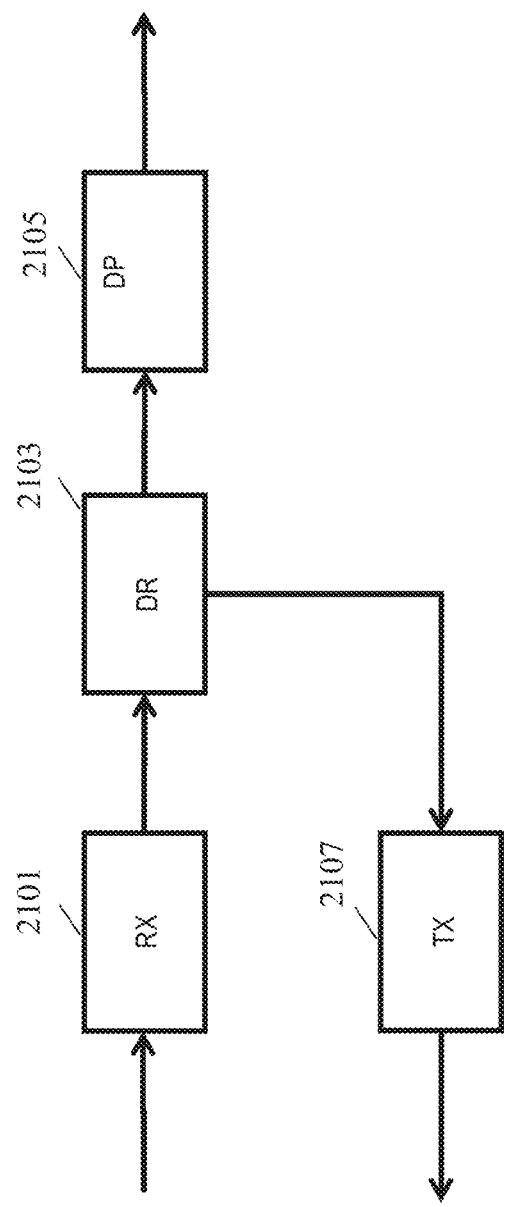
FIG. 21 is an illustration of an example of elements of a display in accordance with some embodiments of the invention.

FIG. 21 illustrates an example of elements of the display 107 where the display provides a display dynamic range indication to the image processing device 103.

In the example, the display comprises a receiver 2101 which receives the image signal output from the image processing device 103. The received image signal is coupled to a driver 2103 which is further coupled to a display panel 2105 which renders the image. The display panel may for example be an LCD or plasma display panel as will be known to the skilled person.

The driver 2103 is arranged to drive the display panel 2105 such that it renders the encoded image. In some embodiments, the driver 2103 may perform advanced and possibly adaptive signal processing algorithms including tone mapping, color grading etc. In other embodiments, the driver 2103 may be relatively low complexity and may e.g. merely perform a standard mapping from the input signal values to drive values for the pixel elements of the display panel 2105.

In the system, the display 107 furthermore comprises a transmitter 2107 which is arranged to transmit a data signal to the image processing device 103. The data signal may for example for a HDMI connection be communicated in a DDC channel using the E-EDID structure as will be described later.

The transmitter 2107 generates the data signal to include the display dynamic range indication for the display (107). Thus, specifically the transmitter 2107 which indicates e.g. the white point luminance and optionally the EOTF of the display. For example, a data value providing an index between a number of predetermined white point luminances or EOTFs may be generated and transmitted.

In some low complexity embodiments, e.g. the white point luminance may be a fixed value stored in the transmitter 2107 which merely communicates this standard value. In more complex values, the display dynamic range indication may be determined to reflect dynamically varying and/or adapted values. For example, the driver 2103 may be arranged to operate in different display modes, and the display dynamic range indication may be adapted accordingly. As another example, the user setting of e.g. a brightness level for the display may be reflected by the display dynamic range indication generated and transmitted by the transmitter 2107.

As mentioned previously, the display dynamic range indication may comprise an ambient light measure and the dynamic range processor may be arranged to adapt the dynamic range transform in response to the ambient light measure. The ambient light measure may be provided as explicit and separate data or may be reflected in other parameters. For example, the ambient light measure may be reflected in the black point luminance which may include a contribution corresponding to light reflections from the display.

In many scenarios the display may include a light detector positioned at the front of the display. This light detector may detect the general ambient light level or may specifically measure light reaching the display from a given directly likely to be reflected back towards a viewer. Based on this light detection, the display can thus generate an ambient light indication which reflects e.g. the ambient light level of the viewing environment in general or e.g. which specifically reflects an estimate of the reflected light from the screen. The display 107 can report this value to the image processing device 103, either as an individual value or e.g. by calculating the effective black luminance level to reflect the amount of light reflections.

The dynamic range processor 203 can then adapt the dynamic range transform accordingly. For example, when the ambient light level is high, more use of the additional bright levels of an HDR display can be used more aggressively to generate a bright looking image with a high contrast. For example, the average light output may be set relatively high and even midrange luminances may be pushed towards the HDR range. Bright areas may be rendered using the full HDR range and even dark areas would typically be rendered at relatively high light levels. However, the increased dynamic range of an HDR image allows for such a relatively bright image to still exhibit large luminance variations and thus to still have a high contrast.

Thus, the HDR capabilities of the display are used to generate an image that provides images which are perceived to be bright and have high contrast even when viewed e.g. in bright daylight. Such an image would typically not be appropriate in a dark room as it would be overpowering and appear far too bright. Thus, in a dark environment, the dynamic range transform would perform a much more conservative LDR to HDR transform which e.g. maintains the same LDR light output for dark and midrange values and only increases the brightness for the brighter areas.

The approach may allow the image processing device 103 to automatically adapt the LDR to HDR dynamic range transform (or e.g. an HDR to HDR dynamic range transform) to match the specific viewing environment of the display. This is furthermore possible without requiring the image processing device 103 to make any measurements of or indeed even to be positioned in or near this environment.

The ambient light indication may typically be optional and thus the image processing device 103 may use it if available and otherwise just perform a default dynamic range transform for the specific characteristics (e.g. OETF of the display).

The optional extension information provided by the display about its viewing environment (especially surrounding light) is thus used by the image processing device 103 to execute more complicated image/video optimizing transforms for presenting optimal image/video to the display where the optimization can include not only characteristics of the display but also of the viewing environment.

Thus, further optimizations can be performed when information is provided by the display about the viewing environment. The display will typically periodically measure the surrounding light and send information (e.g. brightness and color in the form of three parameters: XYZ) about this to the image processing device 103. This information may typically not be provided as part of EDID data or any other data type primarily used for one-time communication of information. Rather, it may be communicated e.g. in a separate channel, such as e.g. using HDMI-CEC. This periodic measurement and update may e.g. result in that if the user e.g. switches off light in the vicinity of the display, the image processing device 103 can automatically adapt the processing to provide images more suitable for the darker viewing situation, e.g. by applying different color/luminance mappings.

An example of a set of relevant parameters that may be reported by the end-user display in the display dynamic range indication includes:

The absolute maximum luminance (white point luminance) of the end-user display.

Gamma of the end-user display—factory setting.

The absolute maximum luminance of the end-user display might for example be defined for typical display settings, factory default settings or settings producing the highest brightness.

Another example of a set of relevant parameters that may be reported by the end-user display in the display dynamic range indication includes:

Maximum luminance of the end-user display for the current settings of brightness, contrast. etc.

Gamma of the end-user display—current settings.

The first set of parameters is time independent whereas the second set varies in time as it depends on user settings. Application of one or the other set has consequences for the behavior of the system and the user experience, and it will be appreciated that the specific set of parameters used in a specific system depends on the preferences and requirements of the system. Indeed, the parameters can be mixed between the two sets, and e.g. the factory default settings can be provided at switch-on, with the user setting dependent parameters being reported periodically thereafter.

It is also appreciated that the specific parameter sets may characterize an EOTF for the display which is either the factory default EOTF or the specific current user setting dependent EOTF. Thus, the parameters can provide information on the mapping between drive values and a luminance output of the display which allows the image processing device 103 to generate the drive values that will result in the desired output image. It will be appreciated that in other implementations other parameters may be used to characterize part of or the entire mapping between drive values and light output for the display.

It will be appreciated that many different approaches can be used for communicating the display dynamic range indication from the display to the image processing device 103.

For example, for parameters of the display that are independent of user settings and do not vary over time, the communication may for an HDMI connection be effectively transferred in a DDC channel using the E-EDID structure.

In a low complexity approach, a set of categories may be defined for end-user displays with each category defining ranges of the relevant parameters. In such an approach only a category identification code for the end-user display needs to be transmitted.

A specific example of a communication of display dynamic range indication data in an E-EDID format will be described.

In the specific example, the first 128 bytes of the E-EDID shall contain an EDID 1.3 structure (base EDID block).

For the display dynamic range indication parameters, a new Display Descriptor Block in the E-EDID data structure may be defined. As current devices are ignorant of such a new Display Descriptor Block, they will merely ignore it thereby providing backwards compatibility. A possible format of this "Luminance behavior" descriptor is listed the table below.

| Byte # | # of bytes | Values | Description |
|---|---|---|---|
| 0, 1 | 2 | 00 h | Indicates that this 18 byte descriptor is a display descriptor |
| 2 | 1 | 00 h | Reserved |
| 3 | 1 | F6 h | Display Descriptor Tag number indicating that this is a Luminance descriptor. |
| 4 | 1 | 00 h | Reserved |
| 5 | 1 | | Peak_Luminance |

-continued

| Byte # | # of bytes | Values | Description |
|---|---|---|---|
| 6-8 | 3 | | transfer curve (optional; e.g. alpha, beta, offset) |

Peak_Luminance is a parameter with a value between 0 and 255 that indicates the peak luminance of the display according to:
 display peak luminance (cd/m2)=50×Peak_Luminance, thereby covering a range of 0 to 255*50=12750 cd/m2 or 255*100

The transfer curve may be a gamma curve (as in ITU601, ITU709, etc.) but allowing for a much higher gamma (up to 10). Or a different transfer (or log) curve parameter may in some scenarios be more appropriate. For example, instead of the gamma function:

$$x^\gamma$$

a power function:

$$\alpha^{\beta x} - \Delta$$

could be used where the parameters $\alpha, \beta$ and $\Delta$ may be set to provide the desired characterization.

The additional information can thus be used by the image processing device 103 to make more advanced decisions for determining different video and graphics (or multi-image component) grey levels, like e.g. global processing such as gamma-based modifications. Having more information, such as on how the display will gamma-remap all grey values, the dynamic range processor 203 can make much smarter decisions for the final look of video and secondary images (and how they may overlap in luminance, depending on also e.g. geometrical properties like how big the subregions are etc.).

In the previous examples, the display 107 provides a display dynamic range indication which informs the image processing device 103 of how the display will display an incoming display signal. Specifically, the display dynamic range indication can indicate the mapping between drive values and light output that is applied by the display. Thus, in these examples the display dynamic range indication informs the image processing device 103 of the available dynamic range and how this is presented, and the image processing device 103 is free to adapt the dynamic range transform as it sees fit.

However, in some systems the display may also be able to exert some control over the dynamic range transform performed by the image processing device 103. Specifically, the display dynamic range indication can comprise dynamic range transform control data, and the dynamic range processor 203 can be arranged to perform the dynamic range transform in response to this dynamic range transform control data.

The control data may for example define an operation or parameter of the dynamic range transform that must be applied, may be applied, or which is recommended to be applied. The control data may furthermore be differentiated for different characteristics of the image to be encoded. For example, individual control data may be provided for a plurality of possible initial images, such as one set for a 500 nits LDR image, another for a 1000 nits encoded image etc.

As an example, the display may specify which tone mapping should be performed by the dynamic range processor 203 depending on the dynamic range of the received image. For example, for a 2000 nits display, the control data may specify one mapping that should be used when mapping from a 500 nits LDR image, and another mapping that should be used when mapping from 1000 nits image etc.

In some scenarios, the control data may specify the boundaries between the mappings with the mappings being predetermined within each interval (e.g. standardized or known at both the content provider side and at the renderer side). In some scenarios, the control data may further define elements of the different mappings or may indeed specify the mappings precisely, e.g. using a gamma value or specifying a specific transformation function.

In some embodiments, the dynamic range transform control data may directly and explicitly specify the dynamic range transform that should be performed to transform the received image to an image with a dynamic range corresponding to the dynamic range of the display. For example, the control data may specify a direct mapping from input image values to output image values for a range of received image white points. The mapping may be provided as a simple parameter allowing the appropriate transform to be realized by the dynamic range processor 203 or detailed data may be provided such as a specific look up table or mathematical function.

As a low complexity example, the dynamic range transform may simply apply piecewise linear function to the input values of an LDR image to generate improved HDR values (or to the input values of an HDR image to generate improved LDR values). Indeed, in many scenarios, a simple mapping consisting of two linear relationships as illustrated in FIG. 20 can be used.

Specifically, as previously described, such an approach can provide a dynamic range transform which maintains the dark areas of an image to remain dark while at the same time allows the substantially increased dynamic range to be used to provide a much brighter rendering of bright areas, as well as indeed an improved and more lively looking midrange. However, the exact transformation depends on the dynamic range of the received image as well as on the dynamic range of the end target display. In some systems, the display may thus specify a tone mapping to be performed by the image processing device 103 simply be communicating the coordinates of the knee of the function (i.e. of the intersection between the linear elements of the mapping).

An advantage of such a simple relationship is that the desired tone mapping may be communicated with a very low overhead. Indeed, a simply two component data value may specify the desired tone mapping to be performed by the image processing device 103 for different displays. Different coordinates of the "knee" point may be communicated for different input images and the image processing device 103 may determine suitable values for other input images by interpolating between the provided values.

It will be appreciated that most of the comments provided with respect to provision of dynamic range transform control data from the content provider apparatus 101 apply equally well (mutatis mutandis) to dynamic range transform control data received from the display 107.

Thus, in some scenarios the display 107 may be in control of the dynamic range transform performed by the image processing device 103. An advantage of such an approach is that it may e.g. allow a user to control the desired rendered image by controlling the display and without any requirement for providing user inputs or settings to the image processing device 103. This may be particularly advantageous in scenarios where a plurality of image processing devices are used with the same display, and in particular it may assist in providing homogeneity between images from different image processing devices.

In many implementations, the control data from the display 107 may not specify a specific tone mapping that should be performed but rather provide data which defines boundaries within which the dynamic range transform/tone mapping may be freely adapted by the image processing device 103.

For example, rather than specify a specific transition point for the curve of FIG. 20, the control data may define limits for the transition point (with possibly different limits being provided for different maximum brightness levels). Thus, the image processing device 103 may individually determine desired parameters for the dynamic range transform such that this can be set to provide the preferred transition for the specific display taking into account e.g. the specific user preferences. However, at the same time display can restrict this freedom to an acceptable level.

Thus, the dynamic range transform control data may include data that defines transform parameters that must be applied by the dynamic range transform performed by the dynamic range processor 203 and/or which define limits for the transform parameters. The control data may provide such information for a range of input image dynamic ranges thereby allowing adaptation of the dynamic range transform to different received images. Furthermore, for input images with dynamic ranges not explicitly included in the control data, appropriate data values may be generated from the available data values, e.g. by interpolation. For example, if a knee point between two linear pieces is indicated for a 500 nits and a 2000 nits input image, a suitable value for a 1000 nits input image may be found by simple interpolation (e.g. by a simple averaging in the specific example).

It will be appreciated that many different and varied approaches for both the dynamic range transform and for how to restrict, adapt and control this from the display side by additional control data may be used in different systems depending on the specific preferences and requirements of the individual application.

In some scenarios, the control data may merely provide a suggestion of suitable mapping that can be applied e.g. in the midrange area. In such a case, the display manufacturer may accordingly assist the image processing device 103 in providing suggested dynamic range transform parameters that have been found (e.g. through manual optimization by the display manufacturer) to provide a high image quality when viewed on the specific display. The image processing device 103 may advantageously use this but is free to modify the mapping e.g. to accommodate for individual user preferences.

In many scenarios the mapping which is at least partially performed on the basis of the control data will represent a relatively low complexity functional relationship, such as a gamma mapping, S-curve, combined mapping defined by partial specifications for individual ranges etc. However, in some scenarios more complex mappings may of course be used.

As mentioned, the control data may provide mandatory or voluntary control data. Indeed, the received data may include one or more fields that indicate whether the tone mapping parameters provided are mandatory, allowed, or suggested.

In some systems, the display may be capable of operating in accordance with different dynamic ranges. For example, a very bright HDR display with a white point luminance of, say, 5000 nits may also be able to operate in a display mode with a white point luminance of 4000 nits, another one with 3000 nits, one with 2000 nits, a further with 1000 nits and finally may operate in an LDR mode having a white luminance of only 500 nits.

In such a scenario, the data signal from the display may indicate a plurality of luminance dynamic ranges. Thus, each of the different luminance dynamic ranges can correspond to a dynamic range mode for the display. In such an arrangement, the dynamic range processor 203 can select one of the luminance dynamic ranges and proceed to perform the dynamic range transform in response to the selected display dynamic range. For example, the dynamic range processor 203 may select the dynamic range of 2000 nits and then proceed to perform the dynamic range transform to optimize the generated image for this white point luminance.

The selection of a suitable luminance dynamic range for the display may be dependent on different aspects. In some systems, the image processing device 103 may be arranged to select a suitable display dynamic range based on the image type. For example, each range may be associated with a given image type, and the image processing device 103 may select the image type that corresponds most closely to the received image, and then proceed to use the dynamic range associated with this image type.

For example, a number of image types may be defined corresponding to different content types. For example, one image type may be associated with cartoons, another with a football match, another with a news program, another with a film etc. The image processing device 103 may then determine the appropriate type for the received image (e.g. based on explicit metadata or on a content analysis) and proceed to apply the corresponding dynamic range. This may for example result in cartoons being presented very vividly and with high contrast and high brightness, while at the same time allowing e.g. dark films to not be rendered unnaturally.

The system may thus adapt to the specific signals being rendered. For example, a poorly made consumer video, a brightly lit football match, a well-lit news program (e.g. scenes with reduced contrast) etc can be displayed differently and specifically the dynamic range of the rendered image may be adapted to that specifically suitable for the specific image.

It was previously mentioned that the display may provide control data to the image processing device 103. However, in some systems it may alternatively or additionally be the image processing device 103 which provides control data to the display 107.

Figure 22:
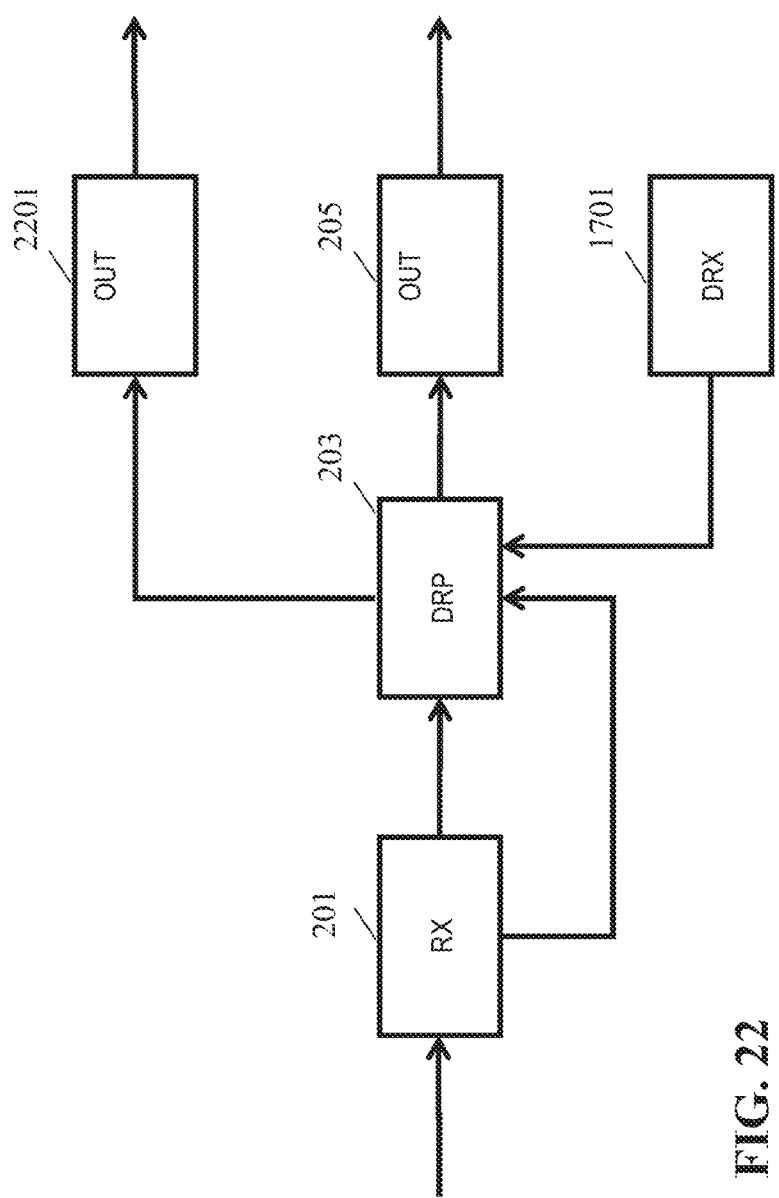
FIG. 22 is an illustration of an example of elements of an image processing apparatus.

Thus, as illustrated in FIG. 22, the image processing device 103 may comprise a controller 2201 which is capable of outputting a display control data signal to the display 107.

The display control signal can specifically instruct the display to operate in the specific dynamic range mode that was selected by the image processing device 103 for the specific image. Thus, as a result, a poorly lit amateur image will be rendered with a low dynamic range thereby avoiding introduction of unacceptable errors due to the transformation to a high dynamic range which is not actually present in the original image. At the same time, the system can automatically adapt such that high quality images can effectively be transformed into high dynamic range images and be presented as such. As a specific example, for an amateur video sequence, the image processing device 103 and display can automatically adapt in order to present the video with a 1000 nits dynamic range. However, for a professionally captured high quality image, the image processing device 103 and the display 107 can automatically adapt to present the video using the full 5000 nits dynamic range that the display 107 is capable of.

The display control signal may thus be generated to include commands such as "use 1000 nits dynamic range", "use LDR range", "use maximum dynamic range" etc.

The display control data may be used to provide a number of commands in the forward direction (from image processing device 103 to display). For example, the control data can include image processing instructions for the display, and specifically can include tone mapping indications for the display.

For example, the control data may specify a brightness setting, clipping setting, or contrast setting that should be applied by the display 107. The image processing instruction may thus define a mandatory, voluntary or suggested operation that should be performed by the display 107 on the received display signal. This control data can thus allow the image processing device 103 to control some of the processing being performed by the display 107.

The control data may for example specify that a specific filtering should be applied or should not be applied. As another example, the control data may specify how backlight operations should be performed. For example, the display may be able to operate in a low power mode which uses aggressive local dimming of a backlight or may be able to operate in a high power mode where local dimming is only used when it can improve the rendering of dark areas. The control data can be used to switch the display between these modes of operation.

The control data may in some examples specify a specific tone mapping that should be performed by the display, or may indeed specify that tone mapping functions should be switched off (thereby allowing the image processing device 103 to fully control the overall tone mapping).

It will be appreciated that in some embodiments, the system may use control data in both directions, i.e. both in a forwards direction from the image processing device 103 to the display 107 and in a backwards direction from the display 107 to the image processing device 103. In such cases, it may be necessary to introduce operating conditions and rules that resolve potential conflicts. For example, it may be arranged that the image processing device 103 is the master device which controls the display 107 and overrules the display 107 in case of conflicts. As another example, control data may be restricted to specific parameters in the two directions such that conflicts do not occur.

As another example, the master and slave relationships may be user settable. For example, an image processing device 103 and a display 107 may both be arranged to provide control data for the other entity, and may specifically both be capable of operating as the master device. The user may in such systems designate one of the devices to be the master device with the other one becoming a slave device. The user may specifically select this based on a preference for him to control the system from the image processing device 103 or from the display 107.

The system described above may thus allow communication between content provider and image processing device and/or communication between image processing device and display. These approaches could be applied in many systems that feature a communication channel between a content provider and an image processing device and/or between an image processing device and a display. Examples include BDROM, ATSC and DVB, or internet, etc.

The system may utilize a communication channel between an image processing device and a display such as an HDMI or Display port communication interface. This communication may be in two directions. E.g., if a smart display is doing all the optimal video and graphics mapping, the image processing device may e.g. read the control parameters, and reformat and transmit them in a similar HDMI structure.

The approach may particularly be applied in a BDROM system. As such the approach may augment BDROM specifications to allow for transmission of target display parameters and control commands. Using such data, in combination with end-user display parameters, may allow the BDROM player to e.g.:

perform additional video and/or graphics tone mapping or other processing in the player depending on the characteristics of the target display and the end-user display.

perform additional video and/or graphics tone mapping or other processing steered by commands in the data stream provided by the content provider.

In some embodiments, the image processing device 103 may also comprise a transmitter for transmitting dynamic range control data to the content provider apparatus 101. Thus, the image processing device 103 may be able to control or at least influence the processing or operation performed at the content provider apparatus 101.

As a specific example, the control data may include an indication of a preferred dynamic range for the image, and may specifically include an indication of a dynamic range (e.g. white point luminance and optionally EOTF or gamma function) for the end-user display.

In some embodiments, the content provider apparatus 101 may be arranged to take the indication of the preferred dynamic range into account when performing a tone mapping. However, in other embodiments, the content provider apparatus 101 may provide a number of predetermined tone mappings, for example involving a manual tone mapping by a tone mapping expert. For example, a tone mapped image may be generated for a 500 nits display, for a 1000 nits display, and for a 2000 nits display.

In such a scenario, the content provider apparatus 101 may be arranged to select which image to transmit to the image processing device 103 based on the received control data. Specifically, the image which is closest to the dynamic range indicated by the control data may be selected and transmitted to the image processing device 103.

Such an approach may be particularly suitable for a streaming application where the streamed signal can dynamically be updated to as far as possible match the dynamic range of the end-user display.

The approach may reduce the degree of dynamic range transformation that must be applied in the image processing device 103 and may specifically for scenarios where the content provider apparatus 101 can provide an image tone mapped to the same dynamic range as the end-user display allow the dynamic range transform to be a simple null operation (i.e. it may allow the received image to be used directly by the image processing device 103.

There are various application scenarios in which the present embodiments can be useful. E.g., encoding of a particular white point, or intended white, or similar value with the pixel image content (e.g. a DCT encoding of the local object textures), allows for a more smart allocation of the needed code levels versus intended output luminances for various possible output signals. One may e.g. encode the texture of a dark room as if it were well illuminated (i.e. up to pixel lumas of 255, rather than having a maximal luma of e.g. 40 in the dark scene image), but specify that the "white", i.e. the 255 has to be treated in a particular way, i.e. that it has to be rendered dark. A simple way to do this is to co-encode e.g. a to be rendered output luminace on the display, for this 255 luma code. The same can be done to encode predominantly very bright values, such as e.g. in a misty scene with strong lights in it.

As to the gamma, this can be used e.g. to indicate whether the material was encoded e.g. based from gradual celluloid negative material, or with a digital camera with a strong saturation setting. Or any other reason to deviate from one gamma intention, to another, typically for the final display on which rendering will occur. EOTFs can typically e.g. encode rather rough grey value behavior, such as compensating e.g. for a display with a different gamma, or different viewing environments, compensatable as different gammas. One can hence convey information such as "signal encoded/intended for, e.g. optimized on, reference display of gamma=X", so that another display with other characteristics knows how to process it to get a more optimal rendering towards artist intentions. Tone mappings can be more generic, in that they can also convey e.g. what typical rendering intents were applied to the image (e.g. the artists made the clouds more menacingly dark, which should with any final display rendering mathematics, still show at least approximately in the output displayed image).

Figure 23:
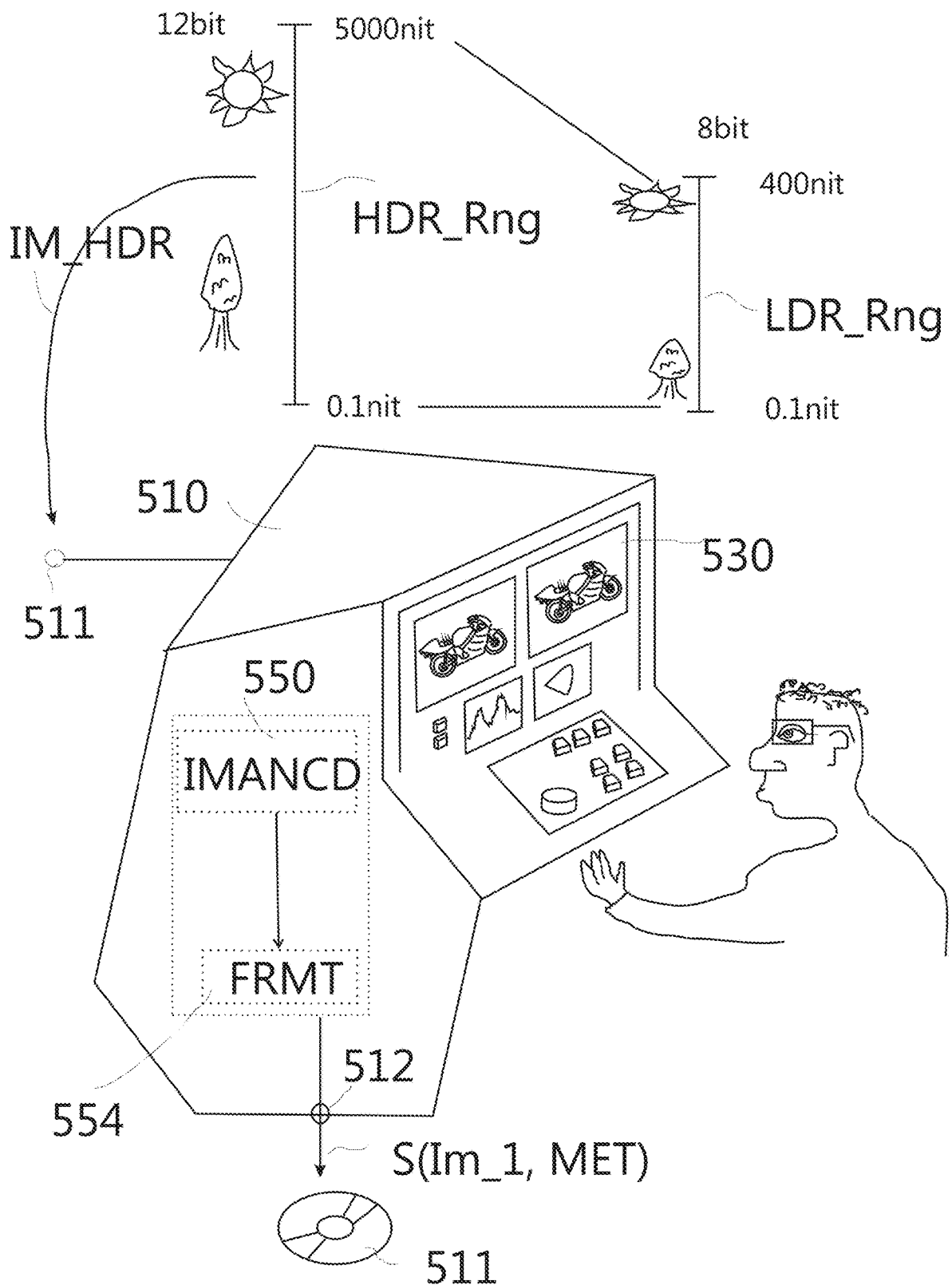
FIG. 23 schematically illustrates a generation of an 8 bit image encoding a HDR image by means of an encoding apparatus

We elucidate one further example by means of FIG. 23, namely the principle of encoding any HDR scene (approximately) in an LDR image ("HDR_encoded_as_LDR"), which could e.g. be a 10 bit image standard, but we will explain the interesting variant of encoding in a classical 8 bit image, i.e. an image which is compatible with e.g. an MPEG2 or AVC standard, and could so be directly used by a classical rendering technology. Although one may desire a lot of bits for an HDR signal, e.g. 12, 16 or 22, 8 bits for the luma channel already conveys a lot of information (many possible colors, especially for approximating complex textures) for any peak white of a rendering. Also, many HDR signals may allow for a significant degree of approximation, since e.g. the sun need not be encoded exactly with the brightness it really has, since it will be approximated when rendered on a display anyway. For LDR ranges of luminance, even a lesser amount of bits will often reasonably suffice, since e.g. 6 bits gives a reasonable approximation/quality of an image (as known from printing).

In the example we hence encode an HDR image exactly within an 8-bit luma structure, by applying the appropriate mappings i.e. mathematical transformations on at least the lumas of the pixels, which are typically simple. The criteria are that on the one hand (by co-encoding the transformations), one can reconstruct the HDR image (i.e. e.g. an 8 bit or 12 bit interpolating approximation intended for a 0.1-5000 nit display rendering) from the LDR 8 bit coded image, by reversing the co-encoded mappings (without the need of any, or significant post correction), i.e. the HDR image will look either psychovisually (nearly) indistinguishable, or at least it will still be a good HDR image (i.e. typically show the HDR scene look, approximating how the HDR would be rendered if it was generated directly from the original e.g. 12 bit HDR image IM_HDR, with its HDR range HDR_Rng of to be rendered luminaces). But on the other hand, we desire an LDR image, i.e. if the 8 bit signal were directly applied to an LDR display of e.g. 0.1-400 nit, which still allows for a good visual rendering. E.g., one might just linearly compress the HDR image IM_HDR to the LDR range LDR_Rng, e.g. by dropping the least significant bits, and assuming the white (maximum code value 255) is intended to be rendered at 400 nit. However, because such HDR images typically contain very bright objects in the upper part of their luma range, such an 8 bit image will look too dark on a LDR display, because the relevant darker parts of the image/scene will now end up at very low luma codes i.e. display output luminances. However, a lot of improvement can already be achieved by applying an optimal gamma prior to the encoding of the HDR/12 bit/5000 nit image into the LDR/8 bit/400 nit classical e.g. AVC representation. I.e., this gamma will map the bright objects to the brighter parts (e.g. making them less contrasty and pastellish but still acceptable on the LDR display, yet with enough information to do a reasonable reverse mapping to HDR again), optimally coordinated by at the same time not squeezing the darker parts (e.g. dark tree) too much, so that these dark objects still look reasonably bright on the LDR display (and also a good HDR dark part can be recreated for dark viewing surround viewing; or enough texture data is available for brighter encoding of these on the HDR display).

In general such a mapping may be a generic global transformation on the lumas (i.e. a mapping that doesn't take into account geometrical local specifics, such as where a pixel resides in the image, or what the lumas of its neighboring pixels are, or what kind of scene object it belongs to, but rather only takes as input the luma value of the pixel). Somewhat more complex mappings may be co-encoded, such as a transformation only for a demarcated subregion or object in the image (local mapping, in which case typically further information is co-encoded such as defining the boundary of the object). But in general, although one could envisage any transformation to work with our disclosed embodiments, be it only to reduce the amount of work of typically a human grader defining these optimal mappings, they will typically be few and simple (no local mapping will be encoded if a general global function such as an S-curve or multipoint spline suffices).

We elucidate the example with a content creator side image encoding apparatus 510, with human optimized encoding of the output image being typically an 8 bit LDR image Im_1 (as typically encompassed with the transformation/mapping functions or algorithmic strategies as metadata MET in some image signal structure S such as prescribed in AVC or HEVC) to a memory (such as a blu-ray disk 511, or a temporary memory, for ultimate encoding on a signal to be stored or transmitted). This grader may check the image on one or more displays 530, e.g. checking whether both the LDR and recoverable HDR image look alright on respective reference LDR and HDR displays, before sending his instructions to the image encoding unit 550 (which does the mapping to the 8 bit luma) and the formatter 554, which finalizes the image and its color codes according to the currently used image coding standard, and co-encodes the texture image with the metadata of the transformation to an output 512.

In the top part we see how the HDR image IM_HDR (which is inputted via an input 511 of the image encoding apparatus 510) with its HDR range is mapped to the LDR image with its LDR range of rendered luminances if on an LDR display.

Although we elucidated the "HDR_encoded_as_LDR" with an encoding on a content creation side for transmission to a content usage side such as a consumer's home, the same "HDR_encoded_as_LDR" embodiments can obviously also be used when transmitting (e.g. by transcoding) between different apparatuses, such as e.g. two home apparatuses in a home network. Then e.g. an automatic image analysis and mapping unit may apply an automatic image analysis and a corresponding luma mapping method. This can be done e.g. by a content receiving or storing apparatus when having a first image representation, such as e.g. the 12 bit HDR image, and sending it over a HDMI or other network connection, to a television. Or the 8 bit LDR image may be encoded according to or for a wireless standard, for streaming to a mobile display, with HDR capabilities, yet of lesser visual quality anyway.

Typically, at least for new HDR standards, in case such a 8 bit encoding (e.g. 8 bit luma and normal 2×8 bit encodings for chroma) in a classical LDR (e.g. MPEG) scheme is done, the standard will annotate in metadata that this LDR image is actually not an LDR image primarily intended for LDR displays (although as said, it may have been constructed so that it still looks reasonable on an LDR display of e.g. 100 nit peak brightness or peak white), but is an HDR image. It may do so with a generic HDR code, which is e.g. assumed to give reasonable renderings for HDR displays with peak brightness around 3500 nit. The in metadata co-encoded first target display reference can also be somewhat more specific, in that this HDR signal was originally graded on e.g. a 5000 nit display. This will mean that the actual lumas of the image objects (also when mapped into LDR lumas) will have values depending on what is typically rendered on a 5000 nit display (e.g. reserving a subrange of high brightness, and pushing normal brightness scene object, typically the main objects in the scene, towards deeper luma values, already in the e.g. 16 bit HDR raw grading). In this case an actual 3500 nit or 2500 nit display, rather than to just use the HDR signal for driving the display assuming it will still give a reasonable picture (the peak brightness being in a range around the intended value 5000 nit), can further optimize is color transformation functions for optimally gamut mapping to the actual display gamut according to a quality criterion (e.g. output luminance similarity, or a psychovisual appearance quality measure on the HDR effects, etc.). One could even co-encode a second peak brightness value for the final HDR_encoded_as_LDR image (e.g., looks most reasonable on a 250 nit display, starting to show slight artefacts on higher and or lower peak brightnesses, potentially even further specifying such artefacts, preferably in a functional way (e.g. geometrical location, etc.), so that a renderer can attempt to correct for the artefacts).

With HDR display we mean a display of peak brightness greater than 750 nit, displays with lower peak brightness, and especially below 500 nit being LDR displays.

The predetermined quality criterion for judging whether the LDR rendering, and the HDR rendering of a recovered HDR signal from the LDR image (typically derived solely by inverting the co-encoded mappings, but some further processing may be done, like the receiving side apparatus may apply a quantization boundary mitigating image processing e.g.), will be either a mathematical algorithm, or the human operator judging that it is good enough when encoding the final image codings for distribution. Both the human applied and software encoded quality estimators will apply such image analysis criteria as: is there sufficient (local) contrast in various regions (i.e. still retaining enough of the visibility of the original e.g. master celluloid negative scan 12 or 14 bit HDR image), in particular the regions central in the image, are there many artefacts like quantization boundaries, and how large or wide are the steps, are there sufficient spatial submodes of the luminance histogram (is the original cinematic look/intent retained), in particular, have spatially separated objects sufficient inter-region contrast, etc. And in particular, if originals are present, like e.g. in a networked system of connected apparatuses, the sending apparatus (e.g. a settopbox) judging whether the recoverable HDR signal is sufficiently close to the original e.g. 12 bit HDR signal present at that location (which may be done based on such mathematical criteria like MSE or PSNR, or psychovisually weighed differences, etc.). E.g., after an automatic luma transformation, and corresponding automatic color adjustment (which may e.g. be a gamma function or similar power function, or an S-curve, tuned on such factors like a typical e.g. median brightness in the scene, or further image analysis like detection of small bright regions and giving them their own subrange and corresponding mapping function, etc.), a color grader (e.g. after first having done the master grading on the 16 bit original HDR) will then further color grade the HDR_encoded_as_LDR image. On the one hand this is hence done to give a nice usable LDR grading, but on the other hand also a recoverable HDR, so he may allocate important information containing regions to subregions of the LDR range which have enough code values, but still shift them to "average" luma ranges which show a good rendering on LDR (e.g. not too dark, so that the darker regions are still well visible, yet dark enough to still convey the mood). Typically he may do so by tweaking the luma/color mapping function(s) from the automatic ones. At least the lumas should be correctly positioned, the color can then be optimized starting from that. E.g., if a certain background region came out to darkish in the LDR rendering, he may still tune the global mapping function in the part corresponding to those pixels, provided it doesn't become worse in other parts of the LDR rendering, and of course via inverse mapping the recoverable HDR image doesn't become of subcritical quality. In principle he could even choose to grade a spatially local image region (be it for the first time, or a second time in addition to a first image encoding for that region) so that it corresponds to another display peak brightness, or gamma etc., than the rest of the image, so that prior to rendering the renderer would have to take that into account. This could be useful e.g. to emphasize dark regions, but in general one would keep things simply fixed to one HDR intended display encoding. So then also the global mapping function from HDR-to-LDR (or its inverse, mapping LDR-to_HDR) and if applicable further transformation data is co-encoded. Legacy systems will ignore all of that, and in principle can use the classically coded LDR image even if the first target display reference and other information is dropped from the image coding signal, but in general one will write this in sectors of the data which were e.g. reserved for upgrading, and are ignored by older systems, but used by the newer ones. A HDR image decoding box could take a look at this data anyway, even though it may be connected to an old LDR display. Instead of just applying the LDR signal to the display for driving the rendering, it could then improve the LDR signal somewhat by a color transformation, given all local factors, and all this additional metadata information (whether using just the type of display that was intended, and "blindly" transforming the LDR inputed signal based on similarity of the current rendering environment with the intended one the grader was working with, or by also using some or all of the information in the mapping functions between the LDR encoding and the original HDR encoding, which information says something about the difference between the two, i.e. the HDR nature and composition of the original scene and/or graded HDR signal).

Such a signal has the advantage that any HDR-capable system knows that we have actually an HDR image encoded as an LDR one, and can optimally recover that HDR image before rendering, yet backwards-compatible, legacy LDR systems can also directly use the LDR image for rendering.

It should be clear to the skilled persons which combinations can be made from our teachings, such as e.g. encoding several HDR gradings for several HDR displays, e.g. in several LDR encodings, regradings, alternatives for different situations such as a change in viewing environment which can also be seen as a display rendering type. Where we mention specific parameters such as 8 bit legacy encoding, of course it should be understood the same can be done with e.g. a 10 bit LDR encoding technology, and we don't want to exclude from protection any variant, combination, or simple alternative realization. So the teachings of our claims can of course be combined, and are considered so described without the tediousness of explicit specification of each and every easily co-readable variant, unless it is clear especially from our description that such isn't possible or intended. Of course the encodings can be used in various scenarios, whether professional or e.g. mobile consumer, several applications like e.g. security systems, news gathering, etc. It can be used largely automatically inside any technical system, like within an IC or multichip, or networked technical system, etc. Some of the parts of the invention may form separate business applications, like e.g. any of the gradings can be performed as a regrading on an existing image encoding, whether already graded in this way, but now improved, or lacking some kind of grading, like for a novel popular display or way of dipslaying.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

All method embodiments and teachings correspond to corresponding apparatus, and potentially further product such as output signals, embodiments, and vice versa. The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. An image processing apparatus, comprising:
   a receiver, wherein the receiver is configured to receive an image signal, wherein the image signal comprises at least a first encoded image and a first target display reference, wherein the first target display reference is indicative of a dynamic range of a first target display device for which the first encoded image is encoded, wherein the image signal comprises pixel lumas for one or more pixels of the first encoded image, wherein the first target display reference comprises an indication of an Electro Optical Transfer Function for the first target display device, wherein the Electro Optical Transfer Function relates luma codes to luminance values, and wherein a highest luminance value corresponds to a highest luma code, and wherein the highest luminance value is above 2000 nits:
   a dynamic range processor, wherein the dynamic range processor is arranged to generate an output image by applying a dynamic range transform function to the pixel lumas of the first encoded image, wherein a shape of the dynamic range transform function is dependent on the indication of the Electro Optical Transfer Function for the first target display device; and
   an output, wherein the output is configured to output an output image signal comprising the output image.

2. The image processing apparatus of claim 1, wherein the first target display reference comprises an indication of a tone mapping which was used to generate the first encoded image for the first target display device.

3. The image processing apparatus of claim 1, wherein the image signal further comprises a data field comprising dynamic range transform control data; and
   wherein the dynamic range processor is further arranged to apply the dynamic range transform function in response to the dynamic range transform control data.

4. The image processing apparatus of claim 3, wherein the dynamic range transform control data comprises different dynamic range transform parameters for different display maximum luminance levels.

5. The image processing apparatus of claim 3, wherein the dynamic range transform control data comprises data defining a set of transform parameters that are applied by the dynamic range transform function.

6. The image processing apparatus of claim 3, wherein the dynamic range transform control data comprises data defining limits for transform parameters to be applied by the dynamic range transform function.

7. The image processing apparatus of claim 3, wherein the dynamic range transform control data comprises different transform control data for different image categories.

8. The image processing apparatus of claim 3, wherein the dynamic range transform control data comprises a tone mapping function to be applied to the first encoded image, and wherein the dynamic range processor is arranged to generate the output image by applying the tone mapping function to the pixel lumas of the first encoded image.

9. The image processing apparatus of claim 1, wherein the dynamic range processor is arranged to detect the first encoded image, wherein the first encoded image is a low dynamic range image, wherein the low dynamic range image is encoded with an MPEG encoding, wherein the dynamic range processor is arranged to read from metadata associated with the image signal, wherein the metadata comprises the dynamic range transform function corresponding to the first target display reference, wherein the dynamic range processor is arranged to generate the output image as a high dynamic range image by applying the dynamic range transform function to the first encoded image, wherein the high dynamic range image is graded for rendering on the first target display device.

10. The image processing apparatus of claim 9, wherein the dynamic range processor is arranged to apply a tone mapping function to pixel lumas for one or more pixels of the low dynamic range image, wherein the tone mapping function is read from the metadata associated with the image signal, wherein the tone mapping function relates luminances of the low dynamic range image to luminances of the high dynamic range image.

11. The image processing apparatus of claim 1, further comprising:
a second receiver, wherein the second receiver is configured to receive a data signal from a destination display, wherein the data signal comprises a data field, wherein the data field comprises an indication of a dynamic range of the destination display, wherein the indication of the dynamic range of the destination display comprises at least one luminance specification for the destination display; and
wherein the dynamic range processor is arranged to apply the dynamic range transform function to the first encoded image in response to the indication of the dynamic range of the destination display.

12. The image processing apparatus of claim 1, wherein the dynamic range processor is arranged to select between generating the output image as the first encoded image and generating the output image as a transformed image of the first encoded image in response to the first target display reference.

13. The image processing apparatus of claim 1, further comprising a control data transmitter for transmitting dynamic range control data to a source of the image signal.

14. The image processing apparatus of claim 1, wherein the first target display reference is indicative of a dynamic range of the first target display device for which the first encoded image is encoded, and wherein the first target display reference is encoded as an identification code.

15. The image processing apparatus of claim 14, wherein the identification code is a numerical identification code selected from a set of codes, wherein the set of codes correspond to a set of Electro Optical Transfer Functions.

16. An image signal encoding apparatus, comprising:
a receiver, wherein the receiver is configured to receive an encoded image;
a generator, wherein the generator is configured to generate an image signal, wherein the image signal comprises the encoded image and a target display reference, wherein the target display reference indicates a dynamic range of a target display device for which the encoded image is encoded, wherein the target display reference comprises an indication of an Electro Optical Transfer Function for the target display device, wherein the Electro Optical Transfer Function relates luma codes to luminance values, wherein a highest luminance value corresponds to a highest luma code, and wherein the highest luminance value is above 2000 nits; and
a transmitter, wherein the transmitter is configured to transmit the image signal comprising the encoded image and the target display reference.

17. The image signal encoding apparatus of claim 16, wherein the target display reference comprises an indication of a tone mapping which was used to generate the encoded image for the target display device.

18. The image signal encoding apparatus of claim 16, wherein the generator is further arranged to generate the image signal such that the image signal comprises a data field, wherein the data field comprises dynamic range transform control data, wherein the dynamic range transform control data is indicative of a parameter of a dynamic range transform function for the encoded image.

19. The apparatus of claim 18, wherein the dynamic range transform control data comprises a tone mapping function to be applied to the encoded image.

20. An image processing method, comprising:
receiving an image signal, wherein the image signal comprises at least a first encoded image and a first target display reference, wherein the image signal comprises pixel lumas for one or more pixels of the first encoded image, wherein the first target display reference is indicative of a dynamic range of a first target display device for which the first encoded image is encoded, wherein the first target display reference comprises an indication of an Electro Optical Transfer Function for the first target display device, wherein the Electro Optical Transfer Function relates luma codes to luminance values, wherein a highest luminance value corresponds to a highest luma code, and wherein the highest luminance value is above 2000 nits;
generating an output image by applying a dynamic range transform function to the pixel lumas of the first encoded image, wherein a shape of the dynamic range transform function is dependent on the indication of the Electro Optical Transfer Function for the first target display device; and
outputting an output image signal, wherein the output image signal comprises the output image.

21. The method of claim 20, wherein the first target display reference comprises an indication of a tone mapping which was used to generate the first encoded image for the first target display device, and wherein generating the output image comprises determining the dynamic range transform function depending on the indication of the tone mapping.

22. The method of claim 20, wherein the image signal further comprises a data field comprising dynamic range transform control data, and wherein generating the output image comprises determining the dynamic range transform function depending on the dynamic range transform control data.

23. The method of claim 22, wherein the dynamic range transform control data comprises a tone mapping function to be applied to the first encoded image, and wherein generating the output image comprises applying the tone mapping function to the pixel lumas of the first encoded image.

24. The method of claim 20, wherein the first encoded image is a low dynamic range image, wherein the low dynamic range image has a maximum white point luminance of no more than 500 nits, wherein the low dynamic range image is encoded with an MPEG encoding.

25. The method of claim 24, comprising applying a tone mapping function to pixel lumas for one or more pixels of the low dynamic range image, wherein the tone mapping function is read from metadata associated with the image signal, wherein the tone mapping function relates luminances of the low dynamic range image to luminances of a high dynamic range image, wherein the high dynamic range image is graded for rendering on the first target display device.

26. The method of claim 20, wherein the first target display reference is indicative of a dynamic range of the first target display device for which the first encoded image is encoded, and wherein the first target display reference is encoded as an identification code.

27. The method of claim 26, wherein the identification code is a numerical identification code selected from a set of codes, wherein the set of codes correspond to a set of Electro Optical Transfer Functions.

28. The method of claim 20, wherein the Electro Optical Transfer Function has a shape which is coordinated with the highest luminance value.

29. The apparatus of claim 16, wherein the target display reference is indicative of a dynamic range of the target display device for which the encoded image is encoded, and wherein the target display reference is encoded as an identification code.

30. The apparatus of claim 29, wherein the identification code is a numerical identification code selected from a set of codes, wherein the set of codes correspond to a set of Electro Optical Transfer Functions.

31. A method of transmitting an image signal which encodes pixel luminances which can have values up to a maximum of at least 1000 nits, the method comprising:

receiving an encoded image;

generating an image signal comprising the encoded image and a target display reference, wherein the target display reference indicates a dynamic range of a target display device for which the encoded image is encoded, wherein the target display reference comprises an indication of an Electro Optical Transfer Function for the target display device, wherein the Electro Optical Transfer Function relates luma codes to luminance values, wherein a highest luminance value corresponds to a highest luma code, and wherein the highest luminance value is above 2000 nits; and transmitting the image signal.

32. The method of claim 31, wherein the Electro Optical Transfer Function has a shape which is coordinated with the highest luminance value.

33. The method of claim 31, wherein the target display reference is indicative of a dynamic range of the target display device for which the encoded image is encoded, and wherein the target display reference is encoded as an identification code.

34. The method of claim 33, wherein the identification code is a numerical identification code selected from a set of codes, wherein the set of codes correspond to a set of Electro Optical Transfer Functions.

35. The method of claim 31, wherein the image signal further comprises a data field comprising dynamic range transform control data, and wherein the dynamic range transform control data comprises a tone mapping function to be applied to the encoded image.

* * * * *

UNITED STATES PATENT AND TRADEMARK OFFICE
CERTIFICATE OF CORRECTION

| | |
|---|---|
| PATENT NO. | : 11,928,803 B2 |
| APPLICATION NO. | : 16/251627 |
| DATED | : March 12, 2024 |
| INVENTOR(S) | : Charles Leonardus Cornelius Maria Knibbeler, Renatus Van Der Vleuten and Wiebe De Haan |

Page 1 of 1

It is certified that error appears in the above-identified patent and that said Letters Patent is hereby corrected as shown below:

In the Claims

Column 54 Line 21 cancel the text beginning with "1. An image processing apparatus" and ending with "value is above 2000 nits:" on Line 36 and insert the following:
--1. An image processing apparatus, comprising:
a receiver, wherein the receiver is configured to receive an image signal, wherein the image signal comprises at least a first encoded image and a first target display reference, wherein the first target display reference is indicative of a dynamic range of a first target display device for which the first encoded image is encoded, wherein the image signal comprises pixel lumas for one or more pixels of the first encoded image, wherein the first target display reference comprises an indication of an Electro Optical Transfer Function for the first target display device, wherein the Electro Optical Transfer Function relates luma codes to luminance values, and wherein a highest luminance value corresponds to a highest luma code, and wherein the highest luminance value is above 2000 nits;--

Signed and Sealed this
Thirtieth Day of April, 2024

Katherine Kelly Vidal
*Director of the United States Patent and Trademark Office*